(12) United States Patent
Russo et al.

(10) Patent No.: US 9,268,991 B2
(45) Date of Patent: Feb. 23, 2016

(54) METHOD OF AND SYSTEM FOR ENROLLING AND MATCHING BIOMETRIC DATA

(71) Applicant: Synaptics Incorporated, San Jose, CA (US)

(72) Inventors: Anthony P. Russo, New York, NY (US); Larry E. Hattery, Beaverton, OR (US); Rohini Krishnapura, Sunnyvale, CA (US); Philip Yiu Kwong Chan, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 170 days.

(21) Appl. No.: 13/851,015

(22) Filed: Mar. 26, 2013

(65) Prior Publication Data

US 2013/0259330 A1 Oct. 3, 2013

Related U.S. Application Data

(60) Provisional application No. 61/615,999, filed on Mar. 27, 2012.

(51) Int. Cl.
*G06K 9/00* (2006.01)
(52) U.S. Cl.
CPC ........ *G06K 9/00087* (2013.01); *G06K 9/00926* (2013.01)
(58) Field of Classification Search
None
See application file for complete search history.

(56) References Cited

U.S. PATENT DOCUMENTS

| 4,151,512 A | 4/1979 | Rigannati et al. |
| 4,225,850 A | 9/1980 | Chang et al. |
| 4,310,827 A | 1/1982 | Asai |
| 4,353,056 A | 10/1982 | Tsikos |

(Continued)

FOREIGN PATENT DOCUMENTS

| DE | 2213813 A1 | 10/1973 |
| EP | 0929028 A2 | 1/1998 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Aaron W Carter
(74) *Attorney, Agent, or Firm* — Leydig, Voit & Mayer, LTD

(57) ABSTRACT

A system and method is disclosed for comparing biometric image data to a stored enrollment template that may comprise collecting a set of biometric image data for a biometric object image from a biometric object imaging sensor; storing the biometric object image data in a memory as an enrollment template for further comparison to find a match with subsequently imaged biometric object image data; collecting a subsequent set of biometric image data for a biometric object image from the biometric object imaging sensor; updating the enrollment template; determining if a limited enrollment window remains open; and repeating the collecting of a subsequent set of biometric data step if the enrollment window remains open. Determining if the enrollment window remains open may be by determining the existence of one of a stability indicator and an instability indicator.

35 Claims, 7 Drawing Sheets

(56) References Cited

U.S. PATENT DOCUMENTS

| | | | |
|---|---|---|---|
| 4,405,829 | A | 9/1983 | Rivest et al. |
| 4,525,859 | A | 6/1985 | Bowles et al. |
| 4,550,221 | A | 10/1985 | Mabusth |
| 4,580,790 | A | 4/1986 | Doose |
| 4,758,622 | A | 7/1988 | Gosselin |
| 4,817,183 | A | 3/1989 | Sparrow |
| 5,076,566 | A | 12/1991 | Kriegel |
| 5,109,427 | A | 4/1992 | Yang |
| 5,140,642 | A | 8/1992 | Hau et al. |
| 5,305,017 | A | 4/1994 | Gerpheide |
| 5,319,323 | A | 6/1994 | Fong |
| 5,325,442 | A | 6/1994 | Knapp |
| 5,420,936 | A | 5/1995 | Fitzpatrick et al. |
| 5,422,807 | A | 6/1995 | Mitra et al. |
| 5,456,256 | A | 10/1995 | Schneider et al. |
| 5,515,738 | A | 5/1996 | Tamori |
| 5,543,591 | A | 8/1996 | Gillespie et al. |
| 5,569,901 | A | 10/1996 | Bridgelall et al. |
| 5,623,552 | A | 4/1997 | Lane |
| 5,627,316 | A | 5/1997 | De Winter et al. |
| 5,650,842 | A | 7/1997 | Maase et al. |
| 5,717,777 | A | 2/1998 | Wong et al. |
| 5,781,651 | A | 7/1998 | Hsiao et al. |
| 5,801,681 | A | 9/1998 | Sayag |
| 5,818,956 | A | 10/1998 | Tuli |
| 5,828,773 | A * | 10/1998 | Setlak et al. ............... 382/126 |
| 5,838,306 | A | 11/1998 | O'Connor |
| 5,848,176 | A | 12/1998 | Harra et al. |
| 5,850,450 | A | 12/1998 | Schweitzer et al. |
| 5,852,670 | A | 12/1998 | Setlak et al. |
| 5,864,296 | A | 1/1999 | Upton |
| 5,887,343 | A | 3/1999 | Salatino et al. |
| 5,892,824 | A | 4/1999 | Beatson et al. |
| 5,903,225 | A | 5/1999 | Schmitt et al. |
| 5,915,757 | A | 6/1999 | Tsuyama et al. |
| 5,920,384 | A | 7/1999 | Borza |
| 5,920,640 | A | 7/1999 | Salatino et al. |
| 5,940,526 | A | 8/1999 | Setlak et al. |
| 5,999,637 | A | 12/1999 | Toyoda et al. |
| 6,002,815 | A | 12/1999 | Immega et al. |
| 6,016,355 | A | 1/2000 | Dickinson et al. |
| 6,052,475 | A | 4/2000 | Upton |
| 6,067,368 | A | 5/2000 | Setlak et al. |
| 6,073,343 | A | 6/2000 | Petrick et al. |
| 6,076,566 | A | 6/2000 | Lowe |
| 6,088,585 | A | 7/2000 | Schmitt et al. |
| 6,098,175 | A | 8/2000 | Lee |
| 6,134,340 | A | 10/2000 | Hsu et al. |
| 6,157,722 | A | 12/2000 | Lerner et al. |
| 6,161,213 | A | 12/2000 | Lofstrom |
| 6,175,407 | B1 | 1/2001 | Santor |
| 6,182,076 | B1 | 1/2001 | Yu et al. |
| 6,182,892 | B1 | 2/2001 | Angelo et al. |
| 6,185,318 | B1 | 2/2001 | Jain et al. |
| 6,234,031 | B1 | 5/2001 | Suga |
| 6,241,288 | B1 | 6/2001 | Bergenek et al. |
| 6,259,108 | B1 | 7/2001 | Antonelli et al. |
| 6,289,114 | B1 | 9/2001 | Mainguet |
| 6,317,508 | B1 | 11/2001 | Kramer et al. |
| 6,320,394 | B1 | 11/2001 | Tartagni |
| 6,332,193 | B1 | 12/2001 | Glass et al. |
| 6,333,989 | B1 | 12/2001 | Borza |
| 6,337,919 | B1 | 1/2002 | Duton |
| 6,346,739 | B1 | 2/2002 | Lepert et al. |
| 6,347,040 | B1 | 2/2002 | Fries et al. |
| 6,360,004 | B1 | 3/2002 | Akizuki |
| 6,362,633 | B1 | 3/2002 | Tartagni |
| 6,392,636 | B1 | 5/2002 | Ferrari et al. |
| 6,399,994 | B2 | 6/2002 | Shobu |
| 6,400,836 | B2 | 6/2002 | Senior |
| 6,401,551 | B1 | 6/2002 | Kawahara et al. |
| 6,408,087 | B1 | 6/2002 | Kramer |
| 6,473,072 | B1 | 10/2002 | Comiskey et al. |
| 6,509,501 | B2 | 1/2003 | Eicken et al. |
| 6,539,101 | B1 | 3/2003 | Black |
| 6,546,122 | B1 | 4/2003 | Russo |
| 6,580,816 | B2 | 6/2003 | Kramer et al. |
| 6,597,289 | B2 | 7/2003 | Sabatini |
| 6,643,389 | B1 | 11/2003 | Raynal et al. |
| 6,672,174 | B2 | 1/2004 | Deconde et al. |
| 6,738,050 | B2 | 5/2004 | Comiskey et al. |
| 6,741,729 | B2 | 5/2004 | Bjorn et al. |
| 6,757,002 | B1 | 6/2004 | Oross et al. |
| 6,766,040 | B1 | 7/2004 | Catalano et al. |
| 6,785,407 | B1 | 8/2004 | Tschudi et al. |
| 6,795,569 | B1 * | 9/2004 | Setlak ........................ 382/124 |
| 6,838,905 | B1 | 1/2005 | Doyle |
| 6,862,942 | B2 | 3/2005 | Kawahata |
| 6,886,104 | B1 | 4/2005 | McClurg et al. |
| 6,897,002 | B2 | 5/2005 | Teraoka et al. |
| 6,898,299 | B1 | 5/2005 | Brooks |
| 6,924,496 | B2 | 8/2005 | Manansala |
| 6,937,748 | B1 | 8/2005 | Schneider et al. |
| 6,941,001 | B1 | 9/2005 | Bolle et al. |
| 6,941,810 | B2 | 9/2005 | Okada |
| 6,950,540 | B2 | 9/2005 | Higuchi |
| 6,959,874 | B2 | 11/2005 | Bardwell |
| 6,963,626 | B1 | 11/2005 | Shaeffer et al. |
| 6,970,584 | B2 | 11/2005 | O'Gorman et al. |
| 6,980,672 | B2 | 12/2005 | Saito et al. |
| 6,983,882 | B2 | 1/2006 | Cassone |
| 7,007,298 | B1 * | 2/2006 | Shinzaki et al. ............... 726/3 |
| 7,013,030 | B2 | 3/2006 | Wong et al. |
| 7,020,591 | B1 | 3/2006 | Wei et al. |
| 7,030,860 | B1 | 4/2006 | Hsu et al. |
| 7,035,443 | B2 | 4/2006 | Wong |
| 7,042,535 | B2 | 5/2006 | Katoh et al. |
| 7,043,061 | B2 | 5/2006 | Hamid et al. |
| 7,043,644 | B2 | 5/2006 | DeBruine |
| 7,046,230 | B2 | 5/2006 | Zadesky et al. |
| 7,064,743 | B2 | 6/2006 | Nishikawa |
| 7,099,496 | B2 | 8/2006 | Benkley |
| 7,110,577 | B1 | 9/2006 | Tschud |
| 7,113,622 | B2 | 9/2006 | Hamid |
| 7,126,389 | B1 | 10/2006 | McRae et al. |
| 7,129,926 | B2 | 10/2006 | Mathiassen et al. |
| 7,136,514 | B1 | 11/2006 | Wong |
| 7,146,024 | B2 | 12/2006 | Benkley |
| 7,146,026 | B2 | 12/2006 | Russon et al. |
| 7,146,029 | B2 | 12/2006 | Manansala |
| 7,190,816 | B2 | 3/2007 | Mitsuyu et al. |
| 7,194,392 | B2 | 3/2007 | Tuken et al. |
| 7,197,168 | B2 | 3/2007 | Russo |
| 7,200,250 | B2 | 4/2007 | Chou |
| 7,251,351 | B2 | 7/2007 | Mathiassen et al. |
| 7,258,279 | B2 | 8/2007 | Schneider et al. |
| 7,260,246 | B2 | 8/2007 | Fujii |
| 7,263,212 | B2 | 8/2007 | Kawabe |
| 7,263,213 | B2 | 8/2007 | Rowe |
| 7,289,649 | B1 | 10/2007 | Walley et al. |
| 7,290,323 | B2 | 11/2007 | Deconde et al. |
| 7,308,121 | B2 | 12/2007 | Mathiassen et al. |
| 7,308,122 | B2 | 12/2007 | McClurg et al. |
| 7,321,672 | B2 | 1/2008 | Sasaki et al. |
| 7,356,169 | B2 | 4/2008 | Hamid |
| 7,359,534 | B2 * | 4/2008 | Semba et al. ................. 382/124 |
| 7,360,688 | B1 | 4/2008 | Harris |
| 7,369,685 | B2 | 5/2008 | DeLeon |
| 7,379,569 | B2 | 5/2008 | Chikazawa et al. |
| 7,409,876 | B2 | 8/2008 | Ganapathi et al. |
| 7,412,083 | B2 | 8/2008 | Takahashi |
| 7,424,618 | B2 | 9/2008 | Roy et al. |
| 7,447,339 | B2 | 11/2008 | Mimura et al. |
| 7,447,911 | B2 | 11/2008 | Chou et al. |
| 7,460,697 | B2 | 12/2008 | Erhart et al. |
| 7,463,756 | B2 | 12/2008 | Benkley |
| 7,505,611 | B2 | 3/2009 | Fyke |
| 7,505,613 | B2 | 3/2009 | Russo |
| 7,565,548 | B2 | 7/2009 | Fiske et al. |
| 7,574,022 | B2 | 8/2009 | Russo |
| 7,616,787 | B2 * | 11/2009 | Boshra ........................ 382/124 |
| 7,643,950 | B1 | 1/2010 | Getzin et al. |
| 7,646,897 | B2 | 1/2010 | Fyke |
| 7,681,232 | B2 | 3/2010 | Nordentoft et al. |

(56) References Cited

U.S. PATENT DOCUMENTS

| | | |
|---|---|---|
| 7,689,013 B2 | 3/2010 | Shinzaki |
| 7,706,581 B2 | 4/2010 | Drews et al. |
| 7,733,697 B2 | 6/2010 | Picca et al. |
| 7,751,601 B2 | 7/2010 | Benkley |
| 7,843,438 B2 | 11/2010 | Onoda |
| 7,899,216 B2 | 3/2011 | Watanabe et al. |
| 7,953,258 B2 | 5/2011 | Dean et al. |
| 8,005,276 B2 | 8/2011 | Dean et al. |
| 8,031,916 B2 | 10/2011 | Abiko et al. |
| 8,077,935 B2 | 12/2011 | Geoffroy et al. |
| 8,810,367 B2 * | 8/2014 | Mullins ................... 340/5.83 |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0003892 A1 * | 1/2002 | Iwanaga ................... 382/124 |
| 2002/0025062 A1 | 2/2002 | Black |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068044 A1 * | 4/2003 | Nikolsky ................... 380/258 |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174256 A1 | 9/2003 | Kim et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka et al. |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0136200 A1 | 6/2005 | Durell et al. |
| 2005/0139656 A1 | 6/2005 | Arnouse |
| 2005/0162402 A1 | 7/2005 | Watanachote |
| 2005/0169503 A1 | 8/2005 | Howell et al. |
| 2005/0185828 A1 * | 8/2005 | Semba et al. ................ 382/124 |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2005/0286745 A1 * | 12/2005 | Kamata et al. ................ 382/115 |
| 2006/0006224 A1 | 1/2006 | Modi |
| 2006/0055500 A1 | 3/2006 | Burke et al. |
| 2006/0066572 A1 | 3/2006 | Yumoto et al. |
| 2006/0078170 A1 * | 4/2006 | Kamata et al. ................ 382/115 |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0187200 A1 | 8/2006 | Martin |
| 2006/0210082 A1 | 9/2006 | Devadas et al. |
| 2006/0210126 A1 * | 9/2006 | Cho ................... 382/124 |
| 2006/0210127 A1 * | 9/2006 | Kim ................... 382/124 |
| 2006/0214512 A1 | 9/2006 | Iwata |
| 2006/0239514 A1 | 10/2006 | Watanabe et al. |
| 2006/0249008 A1 | 11/2006 | Luther |
| 2006/0259777 A1 * | 11/2006 | Izawa ................... 713/186 |
| 2006/0259873 A1 | 11/2006 | Mister |
| 2006/0261174 A1 | 11/2006 | Zellner et al. |
| 2006/0271793 A1 | 11/2006 | Devadas et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0122015 A1 * | 5/2007 | Minamizawa ................ 382/124 |
| 2007/0138299 A1 | 6/2007 | Mitra |
| 2007/0180261 A1 | 8/2007 | Akkermans et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0248249 A1 | 10/2007 | Stoianov |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott et al. |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |

(56) References Cited

U.S. PATENT DOCUMENTS

| | | |
|---|---|---|
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0240523 A1 | 10/2008 | Benkley et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2009/0130369 A1 | 5/2009 | Huang et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0097080 A1 | 4/2010 | Kobayashi et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0182123 A1* | 7/2010 | Press ............... 340/5.28 |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0257352 A1* | 10/2010 | Errico ............... 713/151 |
| 2010/0272329 A1 | 10/2010 | Benkley |
| 2010/0284565 A1 | 11/2010 | Benkley et al. |
| 2011/0002461 A1 | 1/2011 | Erhart et al. |
| 2011/0018556 A1 | 1/2011 | Le et al. |
| 2011/0102567 A1 | 5/2011 | Erhart |
| 2011/0102569 A1 | 5/2011 | Erhart |
| 2011/0182486 A1 | 7/2011 | Valfridsson et al. |
| 2011/0214924 A1 | 9/2011 | Perezselsky et al. |
| 2011/0267298 A1 | 11/2011 | Erhart et al. |
| 2011/0298711 A1 | 12/2011 | Dean et al. |
| 2011/0304001 A1 | 12/2011 | Erhart et al. |
| 2012/0016798 A1* | 1/2012 | Carper ............... 705/43 |
| 2012/0159600 A1* | 6/2012 | Takagi ............... 726/7 |
| 2012/0242635 A1 | 9/2012 | Erhart et al. |
| 2012/0268241 A1* | 10/2012 | Hanna et al. ....... 340/5.52 |
| 2012/0319817 A1* | 12/2012 | Abe ............... 340/5.82 |
| 2013/0038426 A1* | 2/2013 | Yamada ............ 340/5.82 |
| 2013/0063548 A1* | 3/2013 | Rosenberg ......... 348/14.09 |
| 2013/0207779 A1* | 8/2013 | Uno et al. ......... 340/5.82 |
| 2013/0215275 A1* | 8/2013 | Berini et al. ....... 348/150 |
| 2013/0259330 A1* | 10/2013 | Russo et al. ....... 382/124 |
| 2013/0279770 A1* | 10/2013 | Abe ............... 382/124 |
| 2013/0329967 A1* | 12/2013 | Abiko ............. 382/115 |
| 2014/0003678 A1* | 1/2014 | Vieta et al. ....... 382/124 |
| 2014/0003679 A1* | 1/2014 | Han et al. ........ 382/124 |

FOREIGN PATENT DOCUMENTS

| | | |
|---|---|---|
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1538548 A2 | 6/2005 |
| EP | 1624399 B1 | 2/2006 |
| EP | 1939788 A1 | 7/2008 |
| GB | 2331613 A | 5/1999 |
| GB | 2480919 | 12/2011 |
| GB | 2490593 | 11/2012 |
| JP | 04158434 A2 | 6/1992 |
| JP | 2005/242856 | 9/2005 |
| JP | 2010/103240 A | 6/2010 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 01/22349 A1 | 3/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 02/093239 A1 | 11/2002 |
| WO | WO 02/099520 A1 | 12/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |
| WO | WO 2005/106774 A2 | 11/2005 |
| WO | WO 2005/106774 A3 | 11/2005 |
| WO | WO 2006/040724 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/079219 A1 | 6/2009 |
| WO | WO 2009/079221 A2 | 6/2009 |
| WO | WO 2009/079257 A1 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |
| WO | WO 2011/053797 A1 | 5/2011 |

OTHER PUBLICATIONS

Maltoni, "Handbook of Fingerprint Recognition", XP002355942 Springer, New York, USA, Jun. 2003 pp. 65-69.

Vermasan, et al., "A500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Suh, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit

(56) References Cited

OTHER PUBLICATIONS

Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

bellagiodesigns.com (Internet Archive Wayback Machine, www.bellagiodesigns.com date: Oct. 29, 2005).

* cited by examiner

METHOD OF AND SYSTEM FOR ENROLLING AND MATCHING BIOMETRIC DATA

RELATED CASES

The present application claims priority to U.S. Provisional Patent Application No. 61/615,999, filed Mar. 27, 2012, entitled METHOD AND SYSTEM FOR ENROLLING AND MATCHING BIOMETRIC DATA, which is incorporated by reference herein.

BACKGROUND

The presently disclosed subject matter relates to enrolling and matching biometric data in a way that is easier to use, hence providing a more positive user experience than previous solutions. Previously, multiple collections of the same biometric data have been collected during an initial enrollment phase and may prevent enrollment if those multiple collections should prove, during the initial collection phase to be not sufficiently similar. Under certain circumstances this can make enrollment difficult or impossible for a user. Furthermore, even upon successful enrollment, the previous solutions typically fall into one of two categories.

In a first category, as an example, the enrollment data remains unchanged, i.e., is not tuned or modified, or is modified or tuned, once the initial enrollment is complete, but, e.g., for only a very short time, minutes or hours, and/or number of updates, e.g., 1-3 or so. A second category is where the enrollment data is allowed to change for the purposes of improving and/or augmenting the enrollment data for a stored enrollment template of the user's biometric data, without regard to time or effect, i.e., potentially ad infinitum. This latter case can actually be used by sophisticated spoofers to so modify the stored enrollment template to actually change the response to future matching efforts so much as to allow a completely different biometric image to be one that is authenticating access or use or whatever the biometric authentication is being used to authenticate.

Here, spoofing is used in a broader sense than the traditional meaning of attempting to defeat a biometric security system by using a false finger, e.g., with a facsimile of the actual user's biometric, or even removing the actual biometric from the user for use as an input of the biometric image to be compared with a stored enrollment template. Spoofing here also is meant to include any form of attempt at falsely indicating to the system that the image being received, purportedly, but not actually, from an authorized user, to compare with the stored enrollment template, actually matches a stored enrollment template for that authorized user. This can include, as discussed here, modifying the stored enrollment template over time to become a match for a false input image, i.e., one not actually associated with the actual authorized user.

One example of a fingerprint swipe sensor useful with the presently disclosed subject matter is described in U.S. Pat. No. 6,289,114 entitled Fingerprint-Reading System, issued to Mainguet on Sep. 11, 2011. This patent describes a system in which the surface area of the sensor is far smaller than the surface area of the fingerprint to be read. The reading is done when the sensor and the finger are in contact and in a relative motion of sliding of the sensor and the finger with respect to each other. The system reconstitutes a complete two dimensional image of some portion of the fingerprint from the two dimensional partial images given by the sensor during this motion. The manner in which the system reconstitutes a complete image of the fingerprint from the partial images given by the sensor is not described. Another example of a swiped sensor utilizing capacitive coupling through features of the biometric being imaged, e.g., fingerprint ridges and valleys, can be found in U.S. Pat. No. 7,099,496, issued to Benkley, on Aug. 29, 2006, entitled Fingerprint Sensing Systems and Methods, assigned to the assignee of the present application. A so called 2D placement sensor which can be utilized to image part of a finger to get a fingerprint image of a user for authentication by matching to a stored template can be seen in U.S. Pat. No. 5,515,738, issued to Tamori on May 14, 1996, entitled Piezoelectric Surface Pressure Input Panel, utilizing pressure sensing at individual pixel locations in a 2d placement grid array, and U.S. Pat. No. 6,862,942, issued to Kawahata on Mar. 8, 2005, entitled Surface Pressure Distribution Sensor, using a 2D capacitive sensor array.

By way of an example of previous solutions, U.S. Pat. No. 7,616,787, entitled Methods for Finger Biometric Processing and Associated Finger Biometric Sensors, issued to Boshra on Nov. 10, 2009, relates to a swipe type sensor for constructing and then matching biometric images using mosaics from images of small areas of the biometric object, such as horizontal "slices" if a fingerprint image, and/or employing internal image features (minutia), at the physical level. That is, the mosaics are fused at the physical level, which Boshra proposes to change to account for possible misalignments. Thus, Boshra represents an example of approaches to imaging a biometric object, such as a fingerprint, including sensing, image storing and subsequent image comparison with later sensed images. The ongoing update of a stored template as disclosed in Boshra, can be an ever evolving process. That is, as taught in Boshra and other examples, every time the biometric is sampled a new stored enrollment template is potentially created, i.e., modifications to the existing stored enrollment template can occur. As another example of a previous solution, U.S. Pat. No. 6,546,122, entitled Method for Combining Fingerprint Templates Representing Various Sensed Area of Fingerprint to Derive One Fingerprint Template Representing the Fingerprint, issued on Apr. 8, 2003 to Russo, also shows updating a stored enrollment template for future biometric data comparisons using the continuingly updated and stored template.

Standard enrollment using N swipes or touches on a fingerprint sensor, typically has required that the N swipes match each other, at least to some degree, e.g., by some statistical or other criteria of measurement. Such enrollment has relied on the user's natural usage tendencies to create or not create variance in the enrollment data. This has been without regard to sensing area or sensor type, e.g., a linear one dimensional sensor array, a two dimensional swiped sensor array or a two dimensional placement sensor array.

Such known enrollment systems and methods may mostly, but not entirely, apply to two dimensional placement sensor arrays, where the user places the biometric to be sensed and imaged, e.g., on the two dimensional sensor array without swiping. Such enrollment is then meant to capture at least some area of the biometric being sensed and imaged, e.g., the fingerprint of a finger. Depending on the type of sensor array being used, and particularly the size of the sensor array, especially the size in the direction essentially orthogonal to the swipe direction, i.e., along the width of the finger as an example, the sensor array may not be able to sense and image all of the biometric features. That is, all the ridges and valleys of a finger print for the finger that is on or swiping the sensor array. Even with a wider sensor array, the curvature of the biometric on the opposing edges can distort the sensor's detection of a ridge or a valley associated, e.g., with a given pixel location in a reconstructed image. Therefore, after an enrollment template for, e.g., the user's finger is sensed and stored for later comparison when the user again interacts with the sensor array, variations in the way the user interacts can cause false negative matches unwarrantedly denying the user the access sought and frustrating and annoying the user.

As an example, shifting and or rolling or tilting the finger in the vicinity of the sensor can expose areas to the sensor that may not have adequately been sensed before during enrollment, i.e., outside of a so-called "sweet spot" that the linear sensor or 2D swiped sensor or 2D placement sensor is designed and constructed to sense. This can be, e.g., generally on the flat portion of the finger tip portion of the finger, and can also depend on sensor area and the like. Thus the template that was sensed, e.g., in an authentication process, may be determined to be sufficiently different than the stored template stored in an enrollment process. This can result even if the great bulk of the scanned biometric does match the template in some regions, e.g., on one side of the "sweet spot," but does not, e.g., on one side or the other of the sweet spot representing an imaging, e.g., of a portion of the finger on that side not ordinarily sensed in the enrollment process. Such areas, e.g., sides of edges of the biometric can exist that are sensed during a particular authenticating swipe or placement. They can be sensed during a misaligned placement or misaligned or mistimed swipe, etc. in the authentication process but not during the formation of the stored enrollment template, e.g., due to this variation in interaction by the user with the sensor array from when the enrollment template was created. A biometric authentication system and method is needed, therefore, that can address these causes for possible false negative denials of authentication and access or use because of a failure to match the stored biometric image template "sweet spot" or a significant portion of the "sweet spot."

SUMMARY

A system and method is disclosed for comparing biometric image data to a stored enrollment template that may comprise collecting a set of biometric object image data for a biometric object image from a biometric object imaging sensor; storing the biometric object image data in a memory as an enrollment template for further comparison to find a match with subsequently imaged biometric object image data; collecting a subsequent set of biometric object image data for a biometric object image from the biometric object imaging sensor; updating the enrollment template; determining if a limited enrollment window remains open; and repeating the collecting of a subsequent set of biometric object image data step and the updating step if the limited enrollment window remains open. Determining if the limited enrollment window remains open may comprise determining the existence of one of a stability indicator and an instability indicator.

The stability indicator may comprise at least one of a number of times the enrollment template has been updated and a time since the enrollment template was first produced. The stability indicator may comprise a number of successive times that changes to the existing stored enrollment template remain below a selected threshold. The instability indicator may comprise at least one of an amount of biometric image data being added to or removed from the existing stored enrollment template exceeding a selected threshold, possibly also including within a selected time. The instability indicator may comprise the frequency at which at least one of biometric image data being added to or removed from the existing stored enrollment template exceeding a selected threshold.

The system and method may further comprise systems and methods wherein the at least one of a number of times the enrollment template has been updated and a time since the enrollment template was first produced comprises both the number of times the enrollment template has been updated and the time since the enrollment template was first produced. When the enrollment template was first produced may comprise one of when the biometric image data for the enrollment template was first produced and when the enrollment template was first stored. The biometric object may comprise a fingerprint, a palm print, an ocular image, or other still or video image, a voiceprint or other acoustic footprint or audio signal.

The system and method may comprise the entity performing the further comparison to find a match with subsequently imaged biometric object image data comprising a user of the biometric object image data for authentication of the user or a provider of a service of authenticating users. The system and method may further comprise adjusting by the entity the criteria for the limited enrollment window remaining open. The system and method may comprise the entity performing the further comparison to find a match with subsequently imaged biometric object image data comprising a user of the biometric object image data for authentication of the user or a provider of a service of authenticating users, and adjusting by the entity the criteria for determining at least one of the existence of a stability indicator and an instability indicator.

A system and method of comparing biometric image data to a stored enrollment template is also disclosed which may comprise: collecting a set of biometric object image data for a normal biometric object image from a biometric object imaging sensor; storing the normal biometric object image data in a memory as a first enrolled template for further comparison to find a match with subsequently imaged biometric object image data; collecting at least one adjunct set of biometric object image data for a biometric object image at a periphery of the normal biometric object image from the biometric object imaging sensor; collecting a subsequent set of biometric object image data for a biometric object image of a biometric of a user for comparison with the first enrolled template; and if a match is not found with the first enrollment template utilizing at least one of a second enrolled template formed using the first enrolled template the at least one adjunct set of biometric object image data or supplementing the normal biometric object image with the at least one adjunct set of biometric image data to determine if a match exists.

The system and method may further comprise collecting the at least one adjunct set of biometric object image data for a biometric object image at a periphery of the normal biometric object image is obtained by a user positioning the biometric object in a non-normal position with respect to the biometric object imaging sensor. The system and method may further comprise the non-normal positions comprises at least one of rolling the object left or right, rolling the object up or down or tapping the sensor randomly or the non-normal positions may comprise at least one of moving the object in a circular motion, moving the object in rectangular motion, moving the object in a zigzag motion and moving the object in a swipe motion over a normally non-swiped sensor or a misaligned or misdirected swipe motion over a normally swiped sensor.

The system and method may comprise determining that a substantial portion of the stored normal biometric object image data for a substantial portion of the first enrolled template is present in the collected subsequent set of biometric object image data before either the at least one of a second enrolled template or the supplementing the normal biometric object image steps are performed. The system and method may comprise utilizing the determination that a substantial portion of the stored normal biometric object image data for a substantial portion of the first enrolled template is present to determine which of a portion or portions is missing to select either the at least one of a second enrolled template or the adjunct set of biometric object image data to use.

INCORPORATION BY REFERENCE

All publications, patents, and patent applications mentioned in this specification are herein incorporated by reference to the same extent as if each individual publication, patent, or patent application was specifically and individually indicated to be incorporated by reference, for all purposes, and to the same extent as if fully reproduced in the present application including the claims and figures and appendices.

BRIEF DESCRIPTION OF THE DRAWINGS

The novel features of the disclosed subject matter are set forth with particularity in the appended claims. A better understanding of the features and advantages of the presently disclosed subject matter will be obtained by reference to the following detailed description that sets forth illustrative embodiments, in which the principles of the operation and use of the disclosed subject matter are utilized, and the accompanying drawings of which:

DETAILED DESCRIPTION

Figure 1:
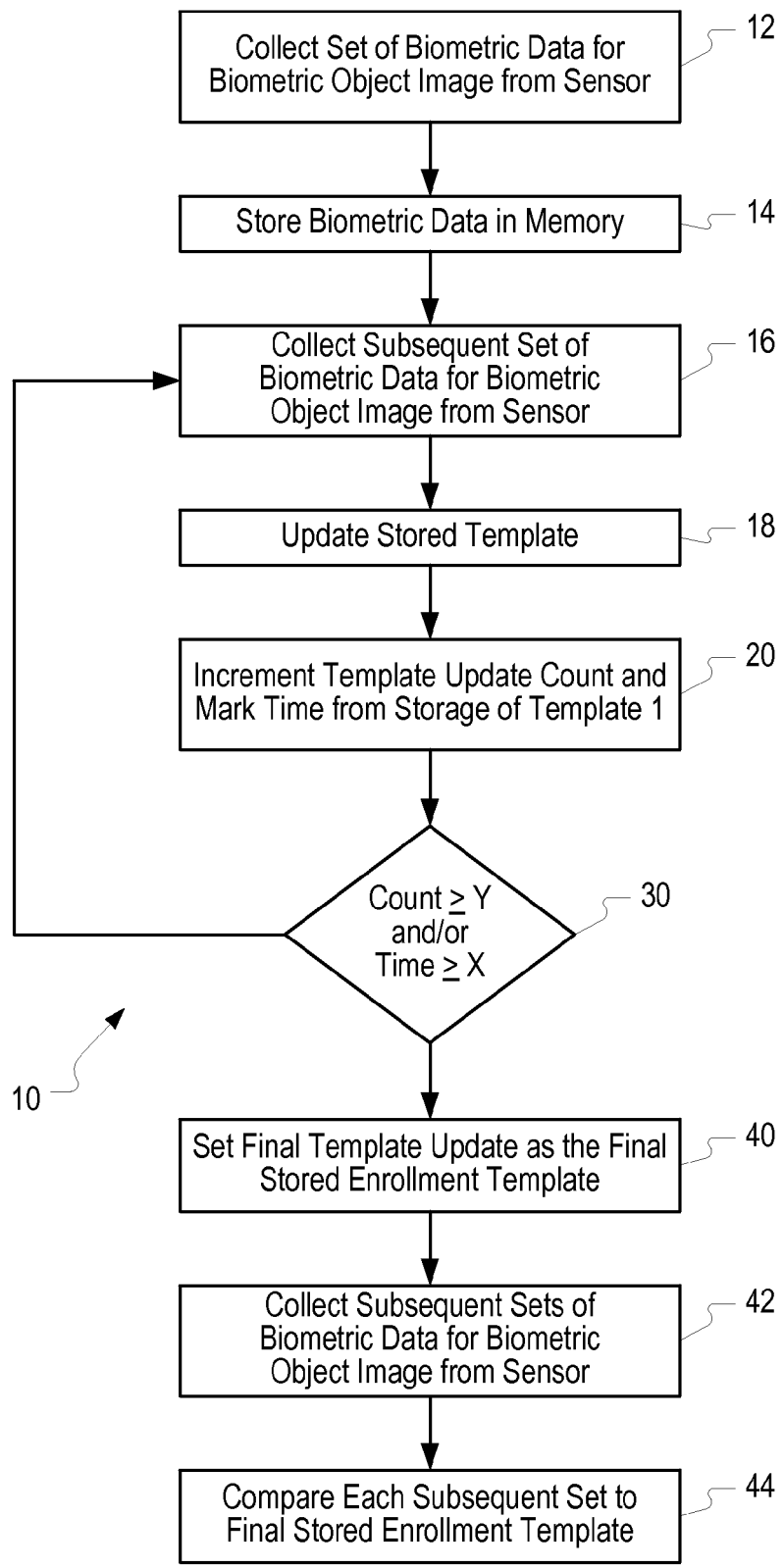
FIG. 1 illustrates a process flow diagram for a process for determining a stability indicator, according to aspects of the disclosed subject matter.

The disclosed subject matter relates to allowing enrollment of an authorized user and establishing a stored enrollment template for later comparison with input from the particular biometric of the user being imaged for comparison with the stored enrollment template, even if the biometric data is not self-similar during an initial enrollment period, i.e., when the system is initially setting up the stored enrollment template for a biometric object, such as a fingerprint, a palm print, an ocular image, or other still or video image, a voiceprint or other acoustic footprint or audio signal, to be compared later for a match to a subsequently sensed image data obtained from the biometric object, it being understood by those skilled in the art that even acoustic or other audio footprints can be considered as "images," in the sense that they are at least capable of being displayed, e.g., on an oscilloscope, as an "image," even if the computer assisted method of comparison of the stored audio "image" does not, from a technical standpoint, compare "images" per se. In the same sense, as is understood in the art, even certain analysis and comparison of biometrics more traditionally thought of as images, such as fingerprints or ocular images, may occur without the production of an "image" per se, but, e.g., through the comparison of characteristics of [arts of all of the images.

The disclosed subject matter also relates to only allowing the stored enrollment template gathered and refined during the enrollment period for the stored enrollment template ("enrollment template") to be modified (updated) for a specified finite period, a "limited enrollment window," after an initial enrollment template is first completed. The "limited enrollment window" can be defined, as an example, by either the presence of an indication of stability in the stored enrollment image or instability in the establishment or modification of the stored enrollment template. The indication of stability ("stability indicator") can be an indication that the stored enrollment image does not need to be further updated and refined, which may be, e.g., an arbitrarily selected combination of time and verification attempts resulting in a further update, since the initial enrollment template was first completed. One or both of these may be selected and used to provide a level of assuredness that no further change and refinement should be needed and at the same time remove likelihood that a "spoofer" could have successfully in the allotted time or number of changes or both have recreated the stored enrollment template to another image of a false user other then the originally authorized user being enrolled.

Other metrics of stability, e.g., that measure how much or how little new information is being added over time may also be used, alone or in combination with the above as a stability indicator. For example, if it appears that the last N verification attempts did not add significant new information to or subtract significant information from the stored enrollment template, or both, then the limited enrollment window could be closed. Similarly, one may wish to prevent too much new information from being added, especially over relatively short periods of time, to guard against hill-climbing attacks. Such as a measure of instability ("instability indicator") may be utilized.

As an example the noted amount of biometric image data being added to or removed from the existing stored enrollment template exceeding a selected threshold may be monitored. Similarly the frequency at which at least one of biometric image data being added to or removed from the existing stored enrollment template exceeding a selected threshold, i.e., per some unit time, may be monitored. These and other indicators that an attempt is being made to defeat the authentication system by so modifying the stored enrollment image as to obtain a "false positive" when other than the actual authorized individual inputs biometric data into the system the system matches the input to the then current stored enrollment template.

Other such attempts to change the stored enrollment template may be contemplated by those in the art as instability indicators and ways to detect these can be considered to be within the claimed determination of the existence of an "instability indicator" and within the claimed determination of a instability indicator. One example may be relatively massive changes over relatively short periods of time to geographically varying portions of the stored enrollment template. As such, there may not be enough change detected by monitoring the changes to the overall stored enrollment template, but enough change to sequentially modify enough of the stored enrollment template to allow for false positive matches. These changes may be detected as to smaller portions and also as to differing smaller portions over the sequences of changes, indicating an effort to eventually modify the entire stored enrollment template to ultimately allow for false positive matches. Other possibilities will occur to those skilled in the art and are all to be considered within the term "instability indicator."

This manner of determining either that a "stability indicator" or an "instability indicator" is present, e.g., by limiting the time period and/or number of times that an enrollment template can be modified can remove security risks inherent in methods that allow the initial enrollment template and subsequent updates of the stored enrollment template to continue to occur without limit. Ad infinitum enrollment template updates, as noted above, are susceptible to attack at any time and continuing modification to the point even that a subsequent biometric object image of a different biometric object can be made to be able to match the stored enrollment template.

The disclosed subject matter limits the possibility of such an attack to a small "limited enrollment window," as an example, measured by either time or numbers of updates or both, while still allowing the originally obtained enrollment template to be refined and updated, especially in the case where the initial enrollment templates were formed from biometric object images that may not have been especially self-similar. As an example, the time period may be defined as within X hours after an initial enrollment template is formed, e.g., around 24 hours and/or a number Y of verification attempts after the initial enrollment template was formed, and resultant template updates, e.g., around 8-10 times. In an alternate embodiment, if within the example of X hours and/ or Y verification attempts, some independent indication of verification occurs, as an example, match scores for subsequent verification attempts are high enough during such selected period, the limited enrollment window can be closed.

Other methods for determining whether the window remains open can be based on spoofing indication metrics, e.g., that measure "instability," e.g., how much new biometric data is being added and/or previously stored old biometric data is being replaced, over time, e.g., if match scores, e.g., succeeding, match scores, either to the originally stored enrollment template or to the immediately preceding stored enrollment template, or some average or weighted average of the previously stored enrollment templates, are too low for a second selected period, the limited enrollment window may also be closed. Alternatively, if the frequency at which new data is being added and/or old data being replaced, i.e., the frequency of newly submitted images, within some relatively short period of time exceeds some threshold, e.g., which can be selected as an example to reflect some measure of ordinary authentication usage, then the limited enrollment window can be closed.

Either of these, among other possible "spoofing" indications, in the broadest sense of "spoofing" noted above, which will be understood by those skilled in the art, can be an instability indicator. The instability indicator can mean a prospective defeater of the system is attempting to alter the stored image in the stored enrollment template in a way that ultimately will allow the system defeater, or someone for whom the system defeater is operating, to improperly be matched as the proper owner of the stored biometric image and thus improperly gain access to or obtain or use some information or right that the biometric authentication is meant to allow to be done only by an original user having the originally properly stored biometric image enrollment template.

The disclosed subject matter provides a system and method of enrolling and matching an image of a biometric object ("biometric object image data") to a stored enrollment template in a way that is easier to use, hence providing a more positive user experience. The disclosed subject matter allows dissimilar biometric object data information to be enrolled and then allows for the improvement and augmentation of that initial biometric object image data contained in the stored enrollment template, using subsequent authentication attempts, e.g., for as long as a "limited enrollment window" remains open.

While the limited enrollment window is open, the imaged biometric data from a verification attempt at matching the then currently stored enrollment template is analyzed to see if it contains new and useful information that should be added to the currently stored version of the enrollment template, e.g., as discussed by way of example in the '787 and '122 patents noted above. If so, such data can be added and becomes part of a more complete stored enrollment template, e.g., also as discussed by way of example in the '787 and '122 patents noted above.

The added data generally helps reduce the false reject rate and improve overall performance. During the time the "limited enrollment window" is open, the system may be subject to attack, but because it can, as an example, typically use a relatively short (e.g. 24 hours) time period and relatively few verification attempts (e.g. 8-10), and/or otherwise determine that the stored enrollment template is "stable," the security threat to compromising the ultimately stored enrollment template for any single user can be greatly reduced. Furthermore, in an alternate embodiment, the user may be required to use alternate means to prove his identity before the enrolled template is allowed to be updated (e.g., password, another biometric such as face, eye, voice or a different finger, being imaged, e.g., one that already has the limited enrollment window closed). Such could also apply in embodiments that look for, e.g., instability as opposed to stability. It will also be understood by those skilled in the art that in addition to notions of stability or instability that affect whether the window remains open, a number of relatively simple criteria, such as, just a simple similarity measure (i.e. a match score) can be used to determine whether to update or not update a template while the window is open. That is, just because a window is open doesn't always mean it will always get updated with new biometric data. That new data may also be required to pass some test, e.g. some similarity level, or dissimilarity level, in order to be added.

However, the system may still allow for some measure of updating and thus optimization of the stored enrollment template for use over the remaining lifetime of the system. This may serve to reduce, e.g., false negatives, i.e., false rejections of there being a match of biometric image data input compared to the then stored enrollment template. That is to say, once the "limited enrollment window" is closed, the system may still behave as does one form of the prior art, in the sense that the enrollment template can no longer be changed by the system. Circumstances may be defined in which such change may continue to occur as in the prior art, and verification using matching of imaged biometric object data from a biometric object compared to the stored enrollment template can proceed normally.

FIG. 1 illustrates a flow diagram for a process 10 according to aspects of the disclosed subject matter for a possible embodiment, where, e.g., a stability indicator may be determined to exist. In block 12, the system and method can collect a set of biometric object image data for a biometric object using a biometric object image sensor, as discussed above and known in the art. In block 14, the system and method 10 can store the biometric image data in a memory as an original biometric object image template ("template 1"), also referred to herein as a stored enrollment template. In block 16, the system and method 10 can collect a subsequent set of biometric object image data for a biometric object imaged by the sensor. The system in block 18 can update the stored enrollment template using the biometric object image data from the subsequent biometric object imaging by the sensor. In block 20, the enrollment template update count can be incremented and time since the production of the template 1 can be noted and recorded.

A decision may then be made in decision block 30 as to whether the enrollment template update count exceeds some selected relatively small number Y, e.g., around 8-10, and/or whether the time since the production of the original enrollment template, template 1, exceeds some relatively short time X, e.g., one day to a week. If either or both thresholds X, Y are exceeded as determined in block 30, the system and method in block 40 can set the final enrollment template update as the final stored enrollment template. If either or both of the thresholds are not exceeded, the system and method can return to block 16. The system and method 10 can then repeat until one or the other or both of the thresholds are indicated in block 30 to be exceeded, in which event, in block 40, the final enrollment template update becomes the final stored enrollment template and the system and method goes on in blocks 42, 44 to continue to gather sets of biometric data and compare them for a match to the final stored enrollment template.

Figure 2:
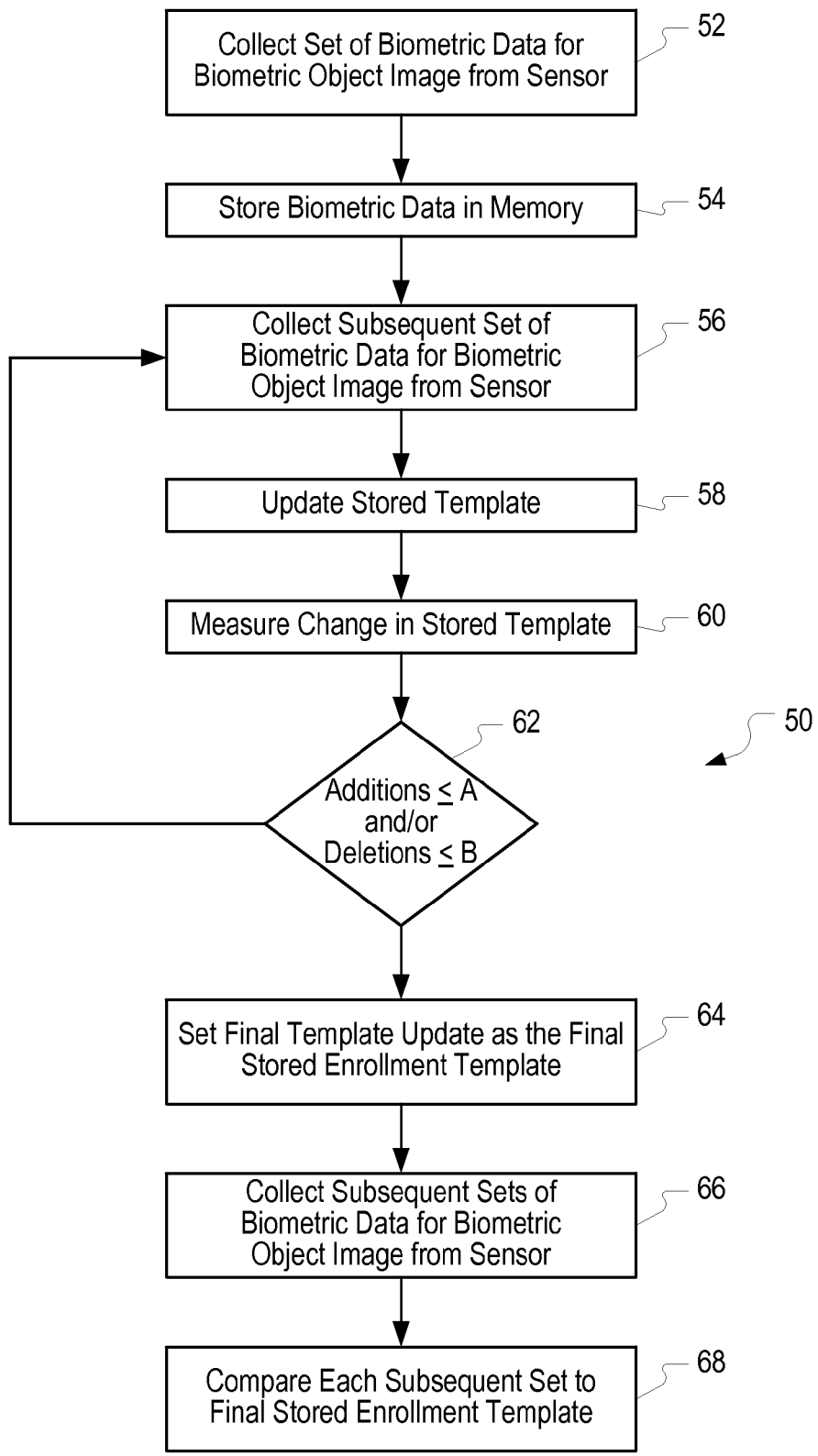
FIG. 2 illustrates a flow diagram for a process where another version of a stability indicator may be determined to exist, according to aspects of an embodiment of the disclosed subject matter.

FIG. 2 illustrates a flow diagram for a process 50 where another possible version of a stability indicator may be determined to exist. In block 52, the system and method 50 can collect a set of biometric object image data for a biometric object using a biometric object image sensor, as discussed above and known in the art. In block 54, the system and method 50 can store the biometric image data in a memory as an original biometric object image template ("template 1"), also referred to herein as a stored enrollment template. In block 56, the system and method 50 can collect a subsequent set of biometric object image data for a biometric object imaged by the sensor. The system in block 58 can update the stored enrollment template using the biometric object image data from the subsequent biometric object imaging by the sensor. In block 60, an amount of change, e.g., either from biometric image data being added to the existing stored enrollment template, the originally stored enrollment template, some averaged or weighted averaged version of the stored enrollment template, or the like, can be determined and measured.

In block 62 the system and method 50 can determine whether a stability indicator is present. As an example where a selected measure of the amount of change does not exceed some threshold, e.g., for some selected number of biometric object image inputs. As an example if the number of additions is less than or equal to a number A and/or the number of deletions is less than or equal to a number B. The system and method 50 may then determine how many of such conditions of lack of change have been recorded, and if the number is high enough then a condition of stability can be determined in block 64 and the last most recent update of the stored enrollment template can be considered as the final enrollment template update and become the final stored enrollment template and the system and method goes on in blocks 66 and 68 to continue to gather sets of biometric image data and compare them for a match to the final stored enrollment template as determined in block 64.

Figure 3:
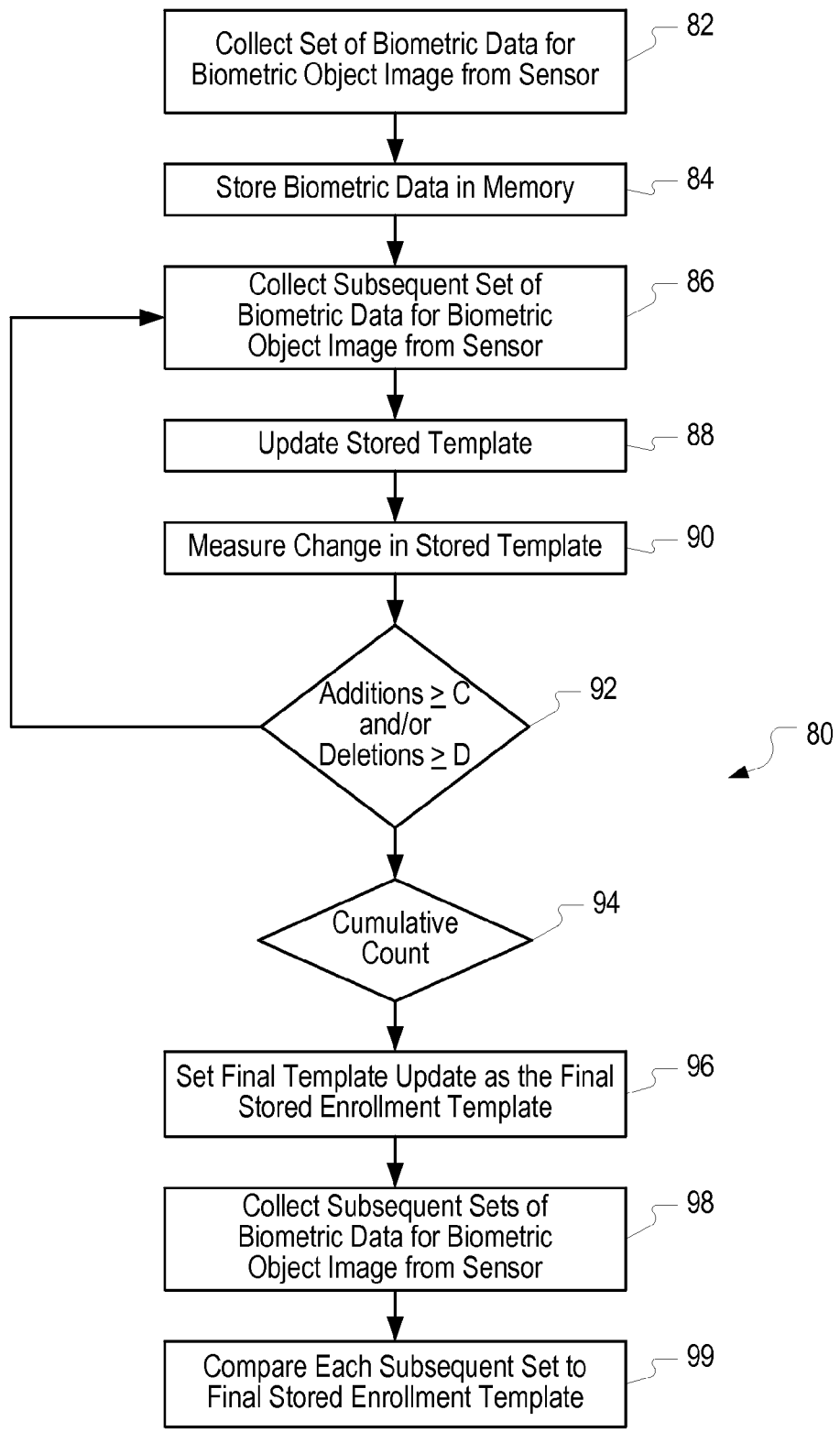
FIG. 3 illustrates a flow diagram for a process where a version of the detection of an instability indicator according to aspects of an embodiment of the disclosed subject matter.

FIG. 3 illustrates a flow diagram for a process 80 where a possible version of an instability indicator may be determined to exist. In block 82, the system and method 80 can collect a set of biometric object image data for a biometric object using a biometric object image sensor, as discussed above and known in the art. In block 84, the system and method 80 can store the biometric image data in a memory as an original biometric object image template ("template 1"), also referred to herein as a stored enrollment template. In block 86, the system and method 80 can collect a subsequent set of biometric object image data for a biometric object imaged by the sensor. The system in block 88 can update the stored enrollment template using the biometric object image data from the subsequent biometric object image from the sensor. In block 90, an amount of change, e.g., either from biometric image data being added to the existing stored enrollment template, the originally stored enrollment template, some averaged or weighted averaged version of the stored enrollment template, or the like, can be determined and measured.

In block 92 the system and method 80 can determine whether an instability indicator is present. As an example where a selected measure of the amount of change exceeds some threshold, e.g., for some selected number of biometric object image inputs, e.g., reflecting some relatively short period of time. As an example, when the number of additions is greater than or equal to a number C and/or the number of deletions is greater than or equal to a number D, then the system and method 80 proceeds block 94 and is not then returns to block 86. In block 94, a cumulative count of the number of such change conditions being met in previous updates to the stored enrollment template can be examined to see if it exceeds some threshold indicating that a condition of instability exists, and in block 96 the last version of the stored enrollment template, or a last updated stored enrollment template, before the detection of the onset of the instability condition, can be considered as the final enrollment template. As an example, if there has been a count of N updates where the change exceeded one or both thresholds as determined in block 92, then a previously stored enrollment template N±x before the count was determined to be exceeded in block 94 can be selected to become the final stored enrollment template, not subject to further updates or changes. The system and method 80 can then go on in blocks 98 and 99 to continue to gather sets of biometric image data and compare them for a match to the final stored enrollment template as determined in block 96. Otherwise, the system and method 80 will return to block 86 and continue to update the stored enrollment template. It will be understood that this process 80 could also be limited by the process of FIG. 1, whereby, even if no instability indicator is detected, the system and method may still be limited by some number of updates and/or some time for allowable updates, as illustrated by way of example in FIG. 1.

It will also be understood that the measure of excessive amount of change over some number of updates may be as to other than the entire biometric image data image. As an example, the system and method may detect excessive change to smaller regions of the image, with such regions varying from one update to the next. Such could indicate, e.g., that the attempt to defeat the system is employing a series of small area changes during each update in order to ultimately modify the entire biometric image stored as the enrollment template.

Figure 4:
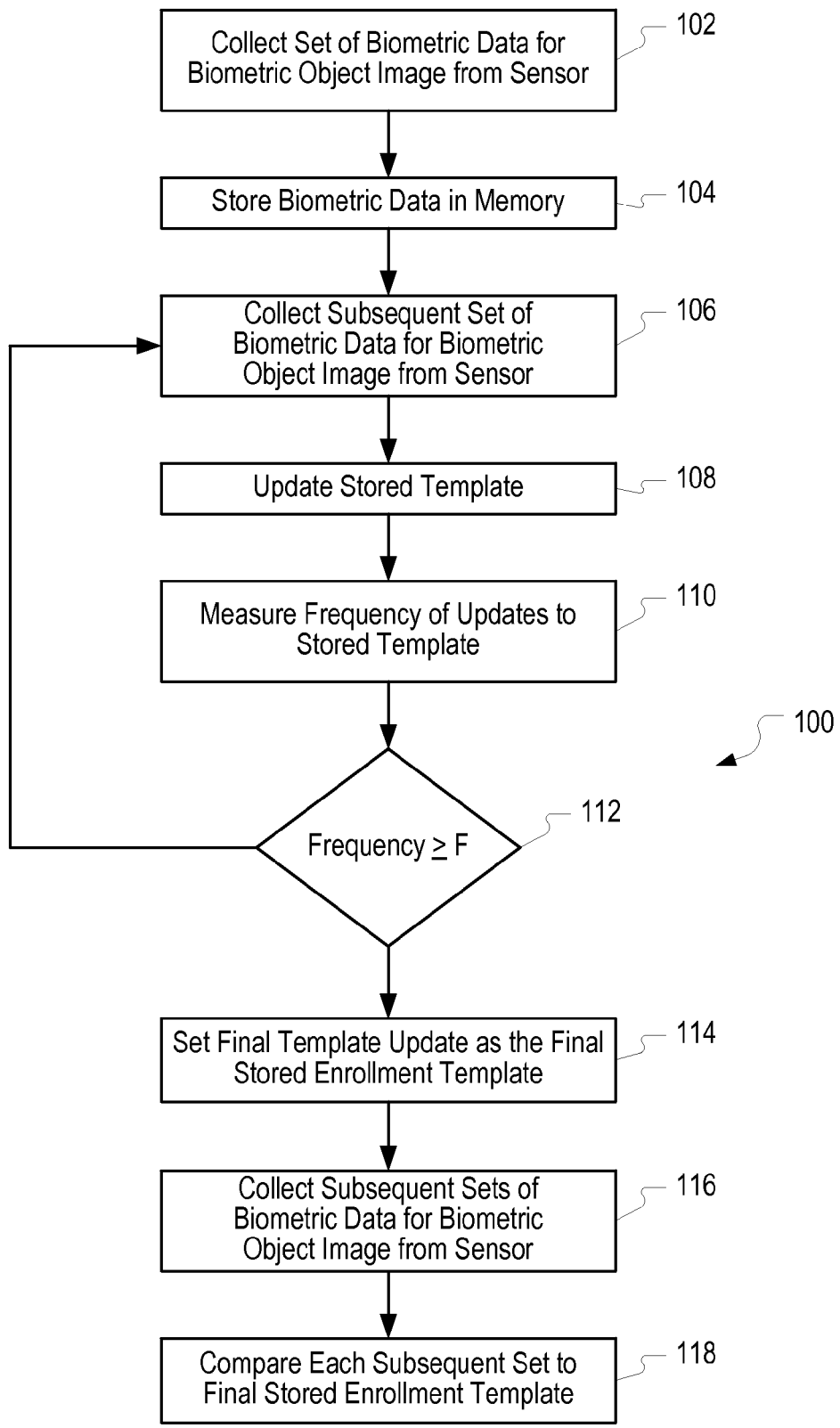
FIG. 4 illustrates a flow diagram for a process for a possible version of the detection of an instability indicator, according to aspects of the disclosed subject matter.

FIG. 4 illustrates a flow diagram for a process 100 where a possible version of the detection of an instability indicator. In block 102, the system and method 100 can collect a set of biometric object image data for a biometric object using a biometric object image sensor, as discussed above and known in the art. In block 104, the system and method 100 can store the biometric image data in a memory as an original biometric object image template ("template 1"), also referred to herein as a stored enrollment template. In block 106, the system and method 100 can collect a subsequent set of biometric object image data for a biometric object imaged by the sensor. The system in block 108 can update the stored enrollment template using the biometric object image data from the subsequent biometric object imaging by the sensor. In block 110, a frequency of updates to the enrollment template, and perhaps for some selected time T can be determined.

In block 112 the system and method 100 can determine whether an instability indicator is present. As an example where the frequency exceeds some value F a condition of instability can be determined and in block 114 the first version of the stored enrollment template, or a last updated stored enrollment template, before the detection of the onset of the instability condition, can be considered as the final enrollment template update and become the final stored enrollment template, not subject to further updates or changes. The system and method 100 can then go on in blocks 116 and 118 to continue to gather sets of biometric image data and compare them for a match to the final stored enrollment template as determined in block 114.

Figure 5:
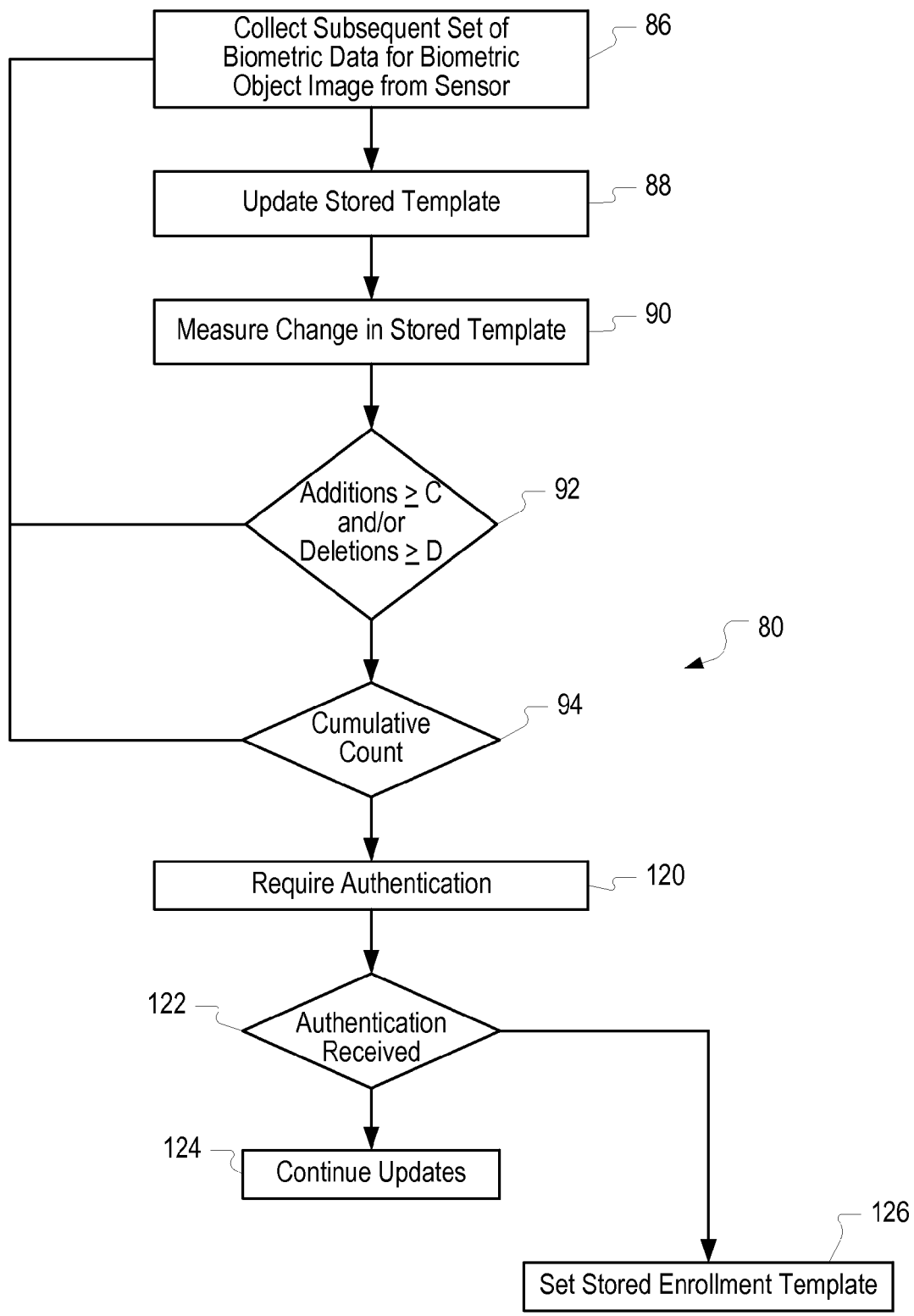
FIG. 5 illustrates a flow diagram of a process for dealing with the detection of an instability indicator, according to aspects of an embodiment of the disclosed subject matter.

In a further possible embodiment, illustrated in FIG. 5, the system 80 of FIG. 3 may be continued after block 94 particularly if some indication is detected that the currently stored enrollment template is in need of legitimate update and modification, such as a higher than usual number of false negative matches with the stored enrollment template, then update of the enrollment template may be allowed with some security precautions implemented. As an example, in block 120, the system and method 80 may receive from the user another form of user authentication, such as a password, another biometric such as a palm, face, eye, voice or a different finger, being imaged, e.g., one that already has the limited enrollment window closed, an encrypted secret challenge or response to a challenge, secure electronic signature or the like. If such further authentication of the user is received as determined in block 122. The system and method 80 may continue to allow updates as indicated in block 124, unless another condition of instability is determined to exist during such further updates. If the further authentication is not received as determined in block 122 the system and method 80 select a stored enrollment template as the final stored enrollment template and allow no further updates of modifications to the stored enrollment template. Alternatively, if another condition of the existence of an instability indicator after bock 124, the system may require yet another additional authentication of simply set the stored enrollment template and allow no further updates.

Those skilled in the art will understand that a system and method is disclosed for comparing biometric object image data to a stored enrollment template that may comprise collecting a set of biometric object image data for a biometric object image from a biometric object imaging sensor; storing the biometric object image data in a memory as an enrollment template for further comparison to find a match with subsequently imaged biometric object image data; collecting a subsequent set of biometric object image data for a biometric object image from the biometric object imaging sensor; updating the enrollment template; determining if a limited enrollment window remains open; and repeating the collecting of a subsequent set of biometric object data step and updating step if the limited enrollment window remains open. The system and method may further comprise determining if the limited enrollment window remains open by determining the existence of a stability indicator or instability indicator, the form of which may be indicated, e.g., by at least one of a number of times the enrollment template has been updated and a time since the enrollment template was first produced.

It will be understood that the "limited enrollment window" may be set to be, according to some embodiments on the order of around one day and/or eight or so updates, as opposed to the prior solutions where both the time and number of updates potentially extends ad infinitum, and certainly for at least well more than one day, i.e., potentially weeks or more, and/or eight or so updates, i.e., potentially dozens of updates. The "limited enrollment window, can be selected to be less than the time and/or number of updates that would be required to so modify the original and subsequently updated enrollment template, as eventually stored according to the disclosed subject matter, to the extent of potentially enabling a different user to be represented by the stored enrollment template, i.e., permit false positive matches. Such was the case with essentially limitless (both temporally and numerically) updates that the term "limited enrollment window" will be understood to distinguish over. At the same time, the exemplary numbers given and other indicators of stability or instability noted above for determining the time the "limited enrollment window" remains open are not meant to limit the time allowed for and/or the number of such updates, or other methods of determination of stability or instability as may be found by those skilled in the art to be necessary to adequately tune the stored enrollment template during the relatively short "limited enrollment window," while at the same time permitting the updating and change of the stored enrollment template to reduce or effectively eliminate false negatives, i.e., rejections of matches that should occur.

The objective is to allow for creation of a relatively accurate and complete stored enrollment template for comparison against subsequently obtained biometric object image data over the rest of the life of the system and method employed by the system, while also protecting against a level of update and modification of the original and subsequently stored version(s) of the enrollment template as to change the user associated with update and what is recognized to be matching biometric object data subsequently sensed by the sensor, i.e., permitting false positive matches. Such significant modification could be a result of the essentially unlimited modifications of the stored enrollment template in the prior art solutions. The difference between such ability to so significantly change the stored enrollment template and a "limited enrollment window," allowing for an effective level of enrollment template refinement, will be understood by those skilled in the art without undue experimentation being needed.

Those skilled in the art will understand that a system and method is disclosed for comparing biometric image data to a stored enrollment template that may comprise collecting a set of biometric object image data for a biometric object image from a biometric object imaging sensor; storing the biometric object image data in a memory as an enrollment template for further comparison to find a match with subsequently imaged biometric object image data; collecting a subsequent set of biometric object image data for a biometric object image from the biometric object imaging sensor; updating the enrollment template; determining if a limited enrollment window remains open; and repeating the collecting of a subsequent set of biometric object image data step and the updating step if the limited enrollment window remains open.

Determining if the limited enrollment window remains open may comprise determining the existence of one of a verification indicator and a spoofing indicator. The verification indicator may comprise at least one of a number of times the enrollment template has been updated and a time since the enrollment template was first produced. The verification indicator may comprise a number of successive times or a selected time period that an amount of change to the existing stored enrollment template remains below a selected threshold. The spoofing indicator may comprise at least one of an amount of biometric image data being added to or removed from the existing stored enrollment template exceeding a selected threshold for a selected time or number of additions and/or removals. The spoofing indicator may comprise the frequency at which at least one of biometric image data being added to or removed from the existing stored enrollment template exceeding a selected threshold.

The system and method may further comprise wherein the at least one of a number of times the enrollment template has been updated and a time since the enrollment template was first produced comprises both the number of times the enrollment template has been updated and the time since the enrollment template was first produced. When the enrollment template was first produced may comprise one of when the biometric image data for the enrollment template was first produced and when the enrollment template was first stored. The biometric object may comprise a fingerprint.

According to aspects of an embodiment of the disclosed subject matter, the user or the authenticating entity or the provider of authentications services, as examples, may further control the adaptive enrollment process. A user template update policy may be created, e.g., defining how the user is to interact with the sensor array for the adaptive matcher to work The user or the entity may tailor the template update policy to specific identified needs.

As noted above, an adaptive matcher can employ one or more criteria to keep the enrollment window open during which a user is permitted to update an enrolled template, and/or such update is automatically carried out for a given user as the user continued to interact with the sensor array, e.g., seeking further or subsequent authentication during the enrollment adaptive matcher update window. According to aspects of the disclosed subject matter, this criteria or criteria may be able to be customized to a user and/or entity, e.g., allowing the user or entity to set an update policy so that they may tailor the adaptive matcher to their needs.

Such individual users, e.g., as customers for an authentication system or the provision of an authentication service, may have different ideas and needs as to how and under what circumstances to allow, e.g., continuing or supplemental updating of an enrollment template. As an example, a policy can be set and followed by an adaptive matcher and the authentication system or application that uses it, so the operation of the adaptive matcher can be customized. Examples of policies might include combinations of: how long the window is open, how many swipes it is open for, whether the window could be reopened if another credential were supplied to prove the identity of the user, whether a successful biometric verification could allow prior verification failures to be used to update the template and under what circumstances, etc. Such policies may be set to an initial default value and be able to subsequently modified by the user/entity. Such policies, e.g., could be made to be dependent on some other criterion, e.g., user type/level/clearance, etc., type of access sought, time of the day or day of the week, etc.

According to aspects of an embodiment of the disclosed subject matter, the criteria for the update policy for the adaptive matcher may be provided as a software module operating on or with the biometric sensor or on the host computing device providing or requiring the concomitant authentication, which may include, e.g., a personal digital assistant, a pad or pod, a portable communications device, such as a cell phone, a host computer, or the like. The module may be accessed on a web-site, e.g., through the user of a web browser operating on of hosted by the host computing device. The module may be used with a variety of biometric sensor array devices, varying in size and shape, e.g., linear, swiped 2D and placement 2D arrays, vary in sensing technology, e.g., capacitive, capacitive gap, optical, piezoelectric, resistive, etc. The module may provide an interface display to the user or entity, e.g., showing the default policy setting, the current policy setting and possible choices for the policy setting. The module could reset all settings to the default setting(s) upon access, but the user/entity can then be allowed, e.g., using a supplied registry of available settings to select customized setting values for the adaptive matcher policy dictates, such as, when and under what conditions an enrolled template may be updated, thus providing further ease of use and customizability for the biometric authentication system and method.

According to other aspects of embodiments of the disclosed subject matter, more biometric image information, e.g., fingerprint image information, can be collected, e.g., by encouraging the user to so cooperate with the sensor in such a way as to naturally capture areas that might not be captured otherwise. This can allow for better performance, e.g., on a small area sensor or equivalent performance on a smaller sensor, both of which are useful outcomes. As an example, variations in what is sensed due to the inconsistent placement or motion of the finger of the user later during, e.g., an authentication access attempt, can be addressed and reduced.

According to aspects of an embodiment of the disclosed subject matter, another software module may be supplied as noted above to the sensor or host computing device or both, or otherwise, that can further modify the enrollment process for a biometric authentication system and method, which may be particularly beneficial for biometric fingerprint placement sensors, but with broader application as well, to linear or swiped 2D sensor arrays. According to this modification, the sensor or the host computing device may have a display or other user interface that, e.g., can be utilized to instruct a user how to move the biometric object of the user that is being sensed, e.g., the finger of the user. At the same time, the biometric object sensor can, e.g., continuously capture sensed biometric data of the biometric being sensed and ultimately to be imaged and/or compared to a template. This can be utilized, as noted below, to improve the performance and usability of the biometric authentication system and method.

As an example, for a two dimensional placement sensor array, e.g., included on a touch screen or on the chassis of a cell phone, during enrollment the user may be prompted to, e.g., roll the biometric object, e.g., the finger of the user, over the sensor in a particular fashion, e.g., with a circular motion. Other motions are also possible, e.g., trace a different pattern, like a square or rectangle; roll the finger left or right; roll the finger up or down; tap the sensor randomly; move the finger over or across the sensor in a zigzag motion, move the finger in a swipe motion. These are all possible regardless of the type of sensor as noted above.

Frames, including for purposes here generically within the term linear one dimensional array swipe scans, can continuously be sensed by the sensor array and provided for analysis. As the user rolls around or otherwise interacts with the sensor to expose what may not usually be exposed to the sensor during, e.g., enrollment of the user using the sensor, the sensor can capture a different region(s) of the finger. As an example, by providing a high enough frame/scan rate, distortion such as blur from the finger motion can be kept at acceptable levels. After capturing a sufficient area of, e.g., the finger, enrollment can be terminated. A software module can be implemented on the sensor and/or host computing device inform the user what to do, e.g., using audio and/or visual prompting. As an example the user can be informed, e.g., through audio or text or both to follow a visual prompt on the sensor, e.g., a 2D placement sensor and pixel locations on the sensor may be sequentially illuminated or electrified or otherwise able to provide some prompting sensation to the user, e.g., tracing a circle or rectangle around the 2D sensor array surface to guide the user's application of the finger of the user to the sensor surface.

According to aspects of embodiments of the disclosed subject matter, the input from the sensor array can be utilized to form templates or portions of templates containing of specifically directed to imaging the portions of the biometric not normally imaged and included in the enrollment template. Techniques exist in the art for correlating these adjunct regions of the biometric, e.g., side regions of the finger, the finger tip, more of the flat portion of the fingerprint, e.g., extending toward the palm of the user's hand, etc. Such techniques can be assisted in performing such steps as correlation of image data from region to region, mosaicing, etc. Such techniques can be assisted by knowledge of the positioning of the finger of the user at the time of the sensing of the respective image frame, e.g., from assuming that the finger is following whatever provided positioning prompt is made available, and, e.g., the derivable knowledge, such as, what array scans are likely to have imaged the same adjunct region on the biometric object, e.g., the finger of the user. According to aspects of an embodiment of the disclosed subject matter, the system and method may simply select a number N of images or partial images, e.g., 2D frames or groupings of a number M of sequential linear array scans, for the finger of the user, after the scanning process noted above and put them all in a template container (i.e. multiple views).

Still further, the rate of finger motion and/or rate of capture may be tracked by the software module, and may be controlled via providing the above noted audio or visual feedback to the user, or the like, to increase/decrease speed of motion in an effort to capture different images which facilitate improved performance. For example, as the finger traces a shape such as a circle, the speed at which the shape is traced may be controlled by, e.g., offering the visual/audio feedback via the software module and applicable user interfaces, e.g., to accelerate the speed. The user can, e.g., be instructed to follow the guidance to correct the finger movement by the user, e.g., to repeat or modify the motion. Enrollment can then be completed once sufficient distinct samples are collected or some other criterion(ia) is met (such as a maximum time limit, or determining enrollment will be unsuccessful for some other reasons, etc.).

It will be understood that even if image scans are being captured continuously, the system and method need only sample periodically and then add to the enrollment template/container. Matching scores and/or other such correlation techniques may be jettisoned while adding to enrollment, e.g., with all scanned image data implicitly accepted to the composite, which however, can have implications, e.g., including poor quality images that contain little or no biometric information, which can led to reduced performance. During the finger motion, scanned sensor array images can be continuously captured and, e.g., stored for later processing. The stored images may then be sampled, e.g., at random, or, as noted above, using knowledge about the overlap from scan to scan, e.g., frame to frame, so as to, e.g., collect an image or a set of images or subset of images that can be utilized to represent, in whole or together, the largest area of the finger available, with minimal redundancy for efficiency.

It will be understood that the image or set of images/views or subset of images/views may then be used in authentication to avoid or significantly decrease false negative authentications. That is, as an example if the user is sloppy or careless or in a hurry and does not place the required, i.e., "key" portion of the biometric, e.g., finger, otherwise referenced here as the "sweet spot," on the sensor array in the proper location, or swipes with too little or too much speed, or starting or ending at a different location on the finger than usual, the availability of the enlarged biometric template image for comparison, or the ability to add image regions to the template from the stored set of adjunct images or subset of adjunct images increases the likelihood of determining that an enrolled or so reconstructed or supplemented template can be found to match the user input at the present time, despite these variations to the sensed image at the time of authentication.

That is, by way of example, with the finger of the user rolled slightly to the right in interacting with the sensor array, a relatively large portion of the left portion of the "sweet spot" template image may not appear in the sensed image and a relatively large portion of the fingerprint image to the right of the "sweet spot" template image may be present. Therefore, if only the rolled image with only a portion of the "sweet spot" were available, the sensor and or the host computing device doing the matching of the sensed biometric image to the stored enrolled template may find significant matching in the part of the finger image usually comprising part of the "sweet spot" template, but little or no matching outside of that area of the fingerprint image, and thus not find an overall match to the stored template. The ability to have a stored template that covers more area than the prior "sweet spot" templates and/or that can be supplemented as necessary in the proper location with the set of adjunct scans/views or subset of such, allows for correlation to the actual scanned image that is offset from the normal "sweet spot." This ability can better be matched to the stored template.

It will also be understood that the advantages of the disclosed subject matter may be even more necessary where the stored template is in the form of some condensed version of the biometric image, e.g., minutia of a fingerprint. This can include, e.g., the type and location in the image of the minutia as compared to a similar listing in the stored template, or hashed values for the pixel locations in each pixel location, i.e., X rows by Y columns pixel locations, or of the rows and/or columns themselves, or the like, may result in virtually no correlation between the scanned image, e.g., shifted or rolled to the right or left or up or down from the "sweet spot." At least one of the rows or columns, in such cases, could be shifted such that it would be hard to correlate the shifted row or column to any of the corresponding "sweet spot" rows or columns. Such would greatly increase the likelihood that no match would be found to the stored template biometric image.

It will be understood by those skilled in the art that a system and method is disclosed that may comprise the entity performing the further comparison to find a match with subsequently imaged biometric object image data comprising a user of the biometric object image data for authentication of the user or a provider of a service of authenticating users. The system and method may further comprise allowing adjustments to be made by the entity to, e.g., the criteria for the limited enrollment window remaining open, including, as an example, reopening the limited enrollment window. The system and method may comprise the entity performing the further comparison to find a match with subsequently imaged biometric object image data comprising a user of the biometric object image data for authentication of the user or a provider of a service of authenticating users, and adjusting by the entity the criteria for determining at least one of the existence of a stability indicator and an instability indicator.

It will also be understood that a system and method of comparing biometric image data to a stored enrollment template is also disclosed which may comprise: collecting a set of biometric object image data for a normal biometric object image from a biometric object imaging sensor, e.g., the usual "sweet spot" image, e.g., at least a significant portion of the generally flat portion of the flat portion of the distal phalanx of the finger, which is the usual part scanned by the image sensor during imaging. Also the system and method may comprise storing the normal biometric object image data in a memory as a first enrolled template for further comparison to find a match with subsequently imaged biometric object image data. Also included may be collecting at least one adjunct set of biometric object image data for a biometric object image at a periphery of the normal biometric object image from the biometric object imaging sensor, e.g., by having the user roll the finger to the right or left, or up or down, etc.

This may be followed by collecting a subsequent set of biometric object image data for a biometric object image of a biometric of a user for comparison with the first enrolled template. If a match is not found with the first enrollment template the system and method may include utilizing at least one of a second enrolled template formed using the first enrolled template the at least one adjunct set of biometric object image data or supplementing the normal biometric object image with the at least one adjunct set of biometric image data to determine if a match exists.

That is to say, if no match is found, the system and method may include selecting at least one other stored enrolled template that may include, e.g., the adjunct portion added to the existing template to make a larger enrollment image covering a larger area than the "sweet spot," on at least one side of the "sweet spot" image, or an enrolled template which is shifted, e.g., to the left or right or up or down to some degree but remains about the same size as the area of the "sweet spot" enrolled image. Such other stored enrolled biometric object image may include, as an example so much of the adjunct image on the side to which the image is shifted, which may include in either or both of the X and Y axes, as the image is so shifted, i.e., as may be missing from the normal scan to construct a new enrolled template that generally matches what was actually scanned due to the improper placement of movement of the biometric object with respect to the sensor sensing elements by the user.

Correlation techniques are available and can be used to determine that there is a match of a substantial portion of the normal enrolled template but not enough for determining a valid authentication match and also that the matching area is shifted in either or both of the X and Y axes with respect to the normal enrolled template. The system and method can then select from, e.g., an enlarged template that covers more area than the normal "sweet spot" template image, or one of a plurality of stored templates that are generally shifted in the same way as the actually scanned biometric object image. Alternatively, e.g., is memory availability is an issue, then the scanned adjunct biometric images can get stored and at authentication scan time, the proper one or ones of the adjunct images may be selected to supplement the actual portion of the "sweet spot" image that was scanned to reconstruct an appropriate biometric object image that corresponds generally to the actual area of the biometric object, e.g., the finger, that was scanned and imaged. In this manner, it can be possible to greatly reduce false negative matches due to improper placement or movement of the biometric object with respect to the biometric object image sensor.

The system and method may further comprise collecting the at least one adjunct set of biometric object image data for a particular area of the a biometric object image at a periphery of the normal biometric object image. Such may be obtained by a user positioning the biometric object in a non-normal position with respect to the biometric object imaging sensor. The system and method may further comprise the non-normal positions comprising at least one of rolling the object (finger) left or right, rolling the object (finger) up or down or tapping the sensor with the object (finger) randomly or the non-normal positions may be sensed by at least one of moving the object (finger) in a circular motion, moving the object (finger) in rectangular motion, moving the object (finger) in a zigzag motion and moving the object (finger) in a swipe motion over a normally non-swiped sensor or a misaligned or misdirected swipe motion over a normally swiped sensor or a misaligned or mis-positioned placement over a placement sensor, or the like.

The system and method may comprise determining that a substantial portion of the stored normal biometric object image data for a substantial portion of the first enrolled template is present in the collected subsequent set of biometric object image data before either the at least one of a second enrolled template or the supplementing the normal biometric object image steps are performed. The system and method may comprise utilizing the determination that a substantial portion of the stored normal biometric object image data for a substantial portion of the first enrolled template is present to determine which of a portion or portions is missing, e.g., in order to select either the at least one of a second enrolled template or the adjunct set of biometric object image data to use to create a second enrolled template.

Figure 6:
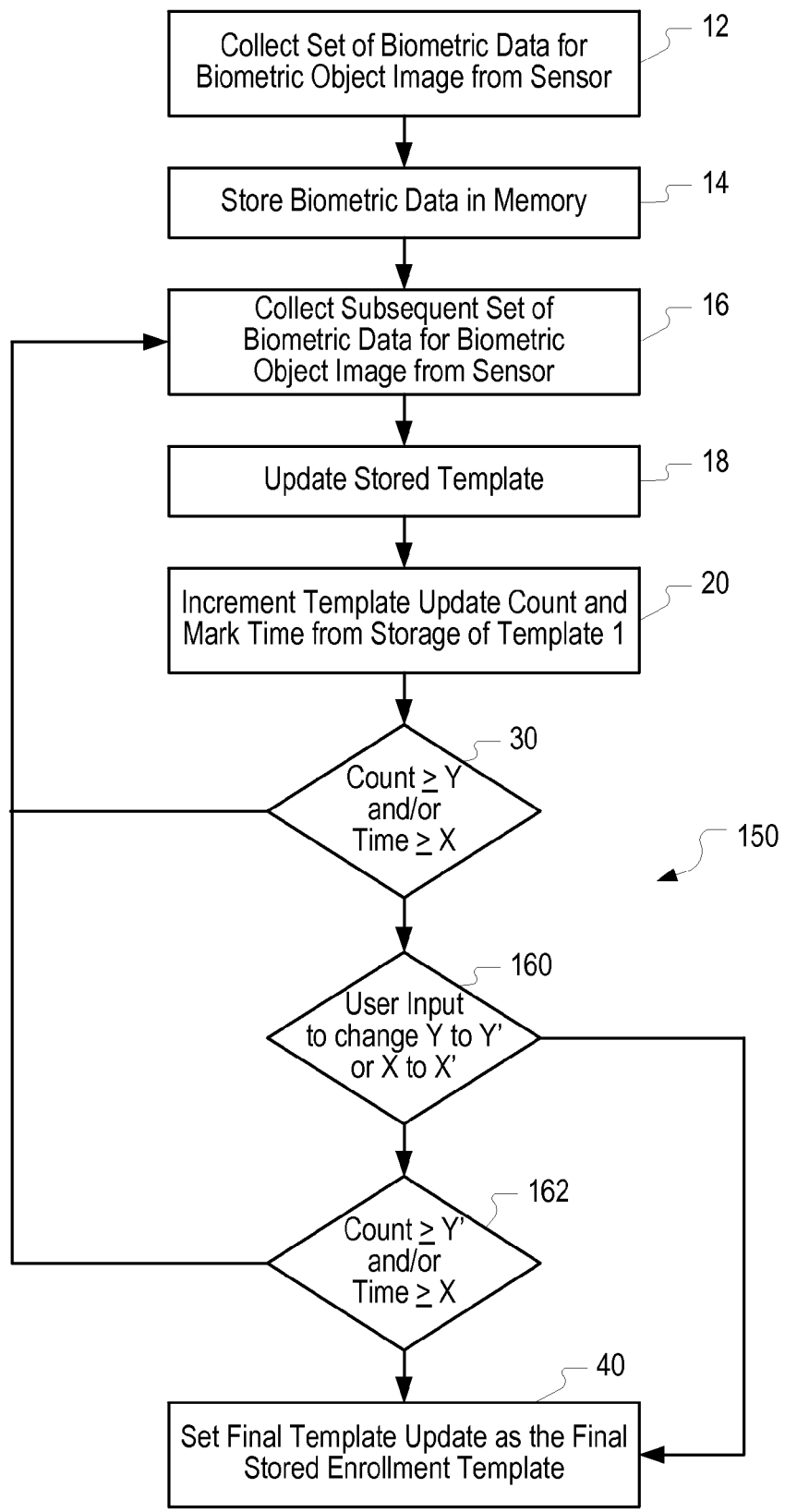
FIG. 6 illustrates a flow diagram of a process according to aspects of an embodiment of the disclosed subject matter.

Turning now to FIG. 6 there is shown in block diagram for a process flow diagram for a process 150 according to aspects of the disclosed subject matter, which is similar in nature to the process 10 of FIG. 1 as discussed above. In the process 150 after the decision is made in the decision block 30 as to whether the count is greater than or equal to Y and/or the time is greater than or equal to T, the process moves to block 160 where a decision is made as to whether any input has been received by the user to change Y to Y' and/or T to T', which will be understood in this instance to be in each case greater than the original value Y or T. If not then the process proceeds to block 40 as in FIG. 1. If so, then the decision is made as to whether the count is greater than or equal to Y' and/or the time T is greater than or equal to T' and if so the final template is set in block 40 as in FIG. 1. It will also be understood that essentially the same process can be implemented as a modification to the processes 50, 80 and 100 of FIGS. 2-5.

Figure 7:
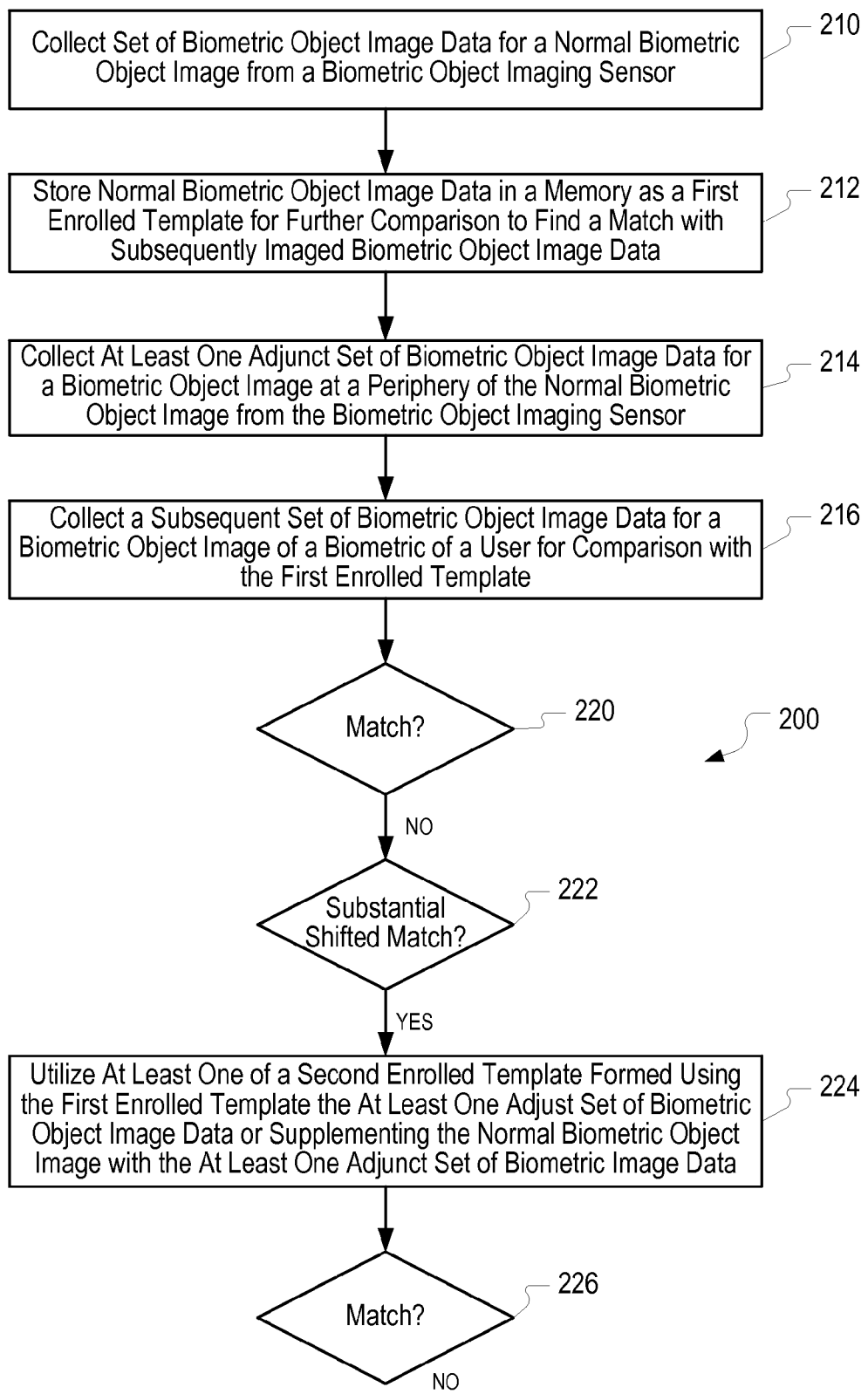
FIG. 7 illustrates a flow diagram of a process according to aspects of an embodiment of the disclosed subject matter.

Turning to FIG. 7 there is shown a block diagram of a process flow chart for a process 200 according to aspects of the disclosed subject matter. In block 210 a process or apparatus for comparing biometric image data to a stored enrollment template may be begun by collecting a set of biometric object image data for a normal biometric object image from a biometric object imaging sensor. In block 212 the normal biometric object image data may be stored in a memory as a first enrolled template for further comparison to find a match with subsequently imaged biometric object image data. In block 214 at least one adjunct set of biometric object image data for a biometric object image at a periphery of the normal biometric object image may be collected from the biometric object imaging sensor.

A subsequent set of biometric object image data for a biometric object image of a biometric of a user may then be collected in block 216 for comparison with the first enrolled template. The subsequently collected biometric image data may be compared with the first stored template to determine if there is a match in comparison block 220. If there is a match then authentication can be carried out as will be understood by those skilled in the art.

If there is no match, i.e., the comparison of the subsequently sensed biometric image data is not a match for the first enrolled image according to the appropriate matching criteria as will be understood by those skilled in the art, then in block 222 a determination may be made if there is a substantial match, but one which is, e.g., shifted in an X or Y axis or both. If that is not the case, then authentication can be ceased. If there is an indication of a substantial match, but one which is, e.g., shifted so that, despite the substantial match in an area of the sensed biometric image data, an overall match cannot be found, then the apparatus and method may proceed to Block 224. In block 224 at least one of a second enrolled template, formed using the first enrolled template and the at least one adjunct set of biometric object image data or formed by supplementing the normal biometric object image with the at least one adjunct set of biometric image data can be selected or formed and utilized to determine if a match exists. If a match is found then authentication can continue as noted above.

The at least one adjunct set of biometric object image data may be collected for a biometric object image at a periphery of the normal biometric object image is obtained by a user positioning the biometric object in a non-normal position with respect to the biometric object imaging sensor. The non-normal positions may comprises at least one of rolling the object left or right, rolling the object up or down or tapping the sensor randomly. The non-normal positions may comprise at least one of moving the object in a circular motion, moving the object in rectangular motion, moving the object in a zigzag motion and moving the object in a swipe motion over a normally non-swiped sensor or a misaligned or misdirected swipe motion over a normally swiped sensor. Determining that a substantial portion of the stored normal biometric object image data for a substantial portion of the first enrolled template is present in the collected subsequent set of biometric object image data may occur, as in block 222, before either the at least one of a second enrolled template or the supplementing the normal biometric object image steps are performed in block 224. The determination that a substantial portion of the stored normal biometric object image data for a substantial portion of the first enrolled template is present may be utilized to determine which of a portion or portions is missing in order to select either the at least one of a second enrolled template or the adjunct set of biometric object image data to use.

It will be understood by those skilled in the art that the disclosed subject matter provides a biometric authentication system wherein a biometric image sensor can be incorporated into a user authentication apparatus providing user authentication, e.g., for controlling access to one of an electronic user device or an electronically provided service. The electronic user device may comprise at least one of a portable phone and a computing device. The electronically provided service may comprise at least one of providing access to a web site or to an email account. The biometric image sensor may be incorporated into a user authentication apparatus providing user authentication for controlling an online transaction. The user authentication apparatus may be a replacement of at least one of a user password or personal identification number. The user authentication apparatus may be incorporated into an apparatus providing user authentication for controlling access to a physical location, or providing user authentication demonstrating the user was present at a certain place at a certain time. The user authentication apparatus may be incorporated into an apparatus providing at least one of a finger motion user input or navigation input to a computing device. The user authentication apparatus may be incorporated into an apparatus providing authentication of the user to a user device and the performance by the user device of at least one other task, e.g., specific to a particular finger of the user. The user authentication apparatus may be incorporated into an apparatus providing user authentication for purposes of making an on-line transaction non-repudiatable.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least emulate a computing device.

The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and/or application specific integrated circuit ("ASIC") customized logic circuitry, such as a controller or microcontroller, a digital signal processor, or any other form of device that can fetch instructions, operate on pre-loaded/pre-programmed instructions, and/or follow instructions found in hard-wired or customized circuitry, to carry out logic operations that, together, perform steps of and whole processes and functionalities as described in the present disclosure. In this description, various functions, functionalities and/or operations may be described as being performed by or caused by software program code to simplify description. However, those skilled in the art will recognize what is meant by such expressions is that the functions resulting from execution of the program code/instructions are performed by a computing device as described above, e.g., including a processor, such as a microprocessor, microcontroller, logic circuit or the like.

Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturers library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller may include a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer-to-peer networks and the like. Different portions of the software program code/instructions and data can be obtained at different times and in different communication sessions or in a same communication session. The software program code/instructions and data can be obtained in their entirety prior to the execution of a respective software application by the computing device.

Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instant of time.

In general, a tangible machine readable medium includes any tangible mechanism that provides (i.e., stores) information in a form accessible by a machine (i.e., a computing device), which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter may be described with reference to block diagrams and operational illustrations of methods and devices to provide a system and methods according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented herein. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/ or operations which are not now known to be order dependent, or become understood to not be order dependent, may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

The disclosed subject matter is described in the present application with reference to one or more specific exemplary embodiments thereof. It will be evident that various modifications may be made to the disclosed subject matter without departing from the broader spirit and scope of the disclosed subject matter as set forth in the appended claims. The specification and drawings are, accordingly, to be regarded in an illustrative sense for explanation of aspects of the disclosed subject matter rather than a restrictive or limiting sense. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method comprising:
    collecting a set of biometric object image data for a biometric object image from a biometric object imaging sensor during an initial enrollment window;
    storing the biometric object image data in a memory as a stored enrollment template for further comparison to find a match with subsequently imaged biometric object image data;
    collecting a subsequent set of biometric object image data for a biometric object image from the biometric object imaging sensor during a limited enrollment window separate from the initial enrollment window and opened after the initial enrollment window ends;
    updating the stored enrollment template;
    determining if the limited enrollment window remains open; and
    repeating the collecting of a subsequent set of biometric object image data step and the updating step if the limited enrollment window remains open,
    wherein the determining if the limited enrollment window remains open comprises determining the existence of one of a stability indicator and an instability indicator, and
        wherein the instability indicator comprises at least one of an amount of biometric image data being added to and an amount of biometric image data being removed from the stored enrollment template exceeding a selected threshold for a selected number of updates of the stored enrollment template.

2. The method of claim 1,
    wherein the stability indicator comprises at least one of a number of times the stored enrollment template has been updated and a time since the stored enrollment template was first produced.

3. The method of claim 1,
    wherein the stability indicator comprises a number of successive times that an amount of change to the stored enrollment template remains below a selected threshold.

4. The method of claim 1,
    wherein the instability indicator comprises at least one of a frequency at which biometric image data being added to and a frequency at which biometric image data being removed from the stored enrollment template exceeding a selected threshold.

5. The method of claim 2 wherein the stability indicator comprises both the number of times the stored enrollment template has been updated and the time since the stored enrollment template was first produced.

6. The method of claim 5 wherein when the stored enrollment template was first produced comprises one of when the biometric image data for the stored enrollment template was first produced and when the biometric image data for the stored enrollment template was first stored.

7. The method of claim 1 wherein the biometric object image comprises a fingerprint.

8. The method of claim 2 wherein the biometric object image comprises a fingerprint.

9. The method of claim 3 wherein the biometric object image comprises a fingerprint.

10. A non-transitory computer readable medium storing instructions that, when executed by a computing device, cause the computing device to perform a method, the method comprising:
  collecting a set of biometric object image data for a biometric object image from a biometric object imaging sensor during an initial enrollment window;
  storing the biometric object image data in a memory as a stored enrollment template for further comparison to find a match with subsequently imaged biometric object image data;
  collecting a subsequent set of biometric image data for a biometric object image from the biometric object imaging sensor during a limited enrollment window separate from the initial enrollment window and opened after the initial enrollment window ends;
  updating the stored enrollment template;
  determining if the limited enrollment window remains open; and
  repeating the collecting of a subsequent set of biometric data step if the limited enrollment window remains open,
  wherein the determining if the limited enrollment window remains open comprises determining the existence of at least one of a stability indicator and an instability indicator, and
    wherein the instability indicator comprises at least one of an amount of biometric image data being added to and an amount of biometric image data being removed from the stored enrollment template exceeding a selected threshold for a selected number of updates of the stored enrollment template.

11. The non-transitory computer readable medium of claim 10, wherein the stability indicator comprises at least one of a number of times the stored enrollment template has been updated and a time since the stored enrollment template was first produced.

12. The non-transitory computer readable medium of claim 10, wherein the stability indicator comprises a number of successive times that an amount of change to the stored enrollment template remains below a selected threshold.

13. The non-transitory computer readable medium of claim 10, wherein the instability indicator comprises at least one of a frequency at which biometric image data being added to and a frequency at which biometric image data being removed from the stored enrollment template exceeding a selected threshold.

14. The non-transitory computer readable medium of claim 10, wherein the biometric object image comprises a fingerprint.

15. A system comprising:
  a biometric object image sensor configured to collect a set of biometric object image data for a biometric object image during an initial enrollment window;
  a memory configured to store the biometric object image data as a stored enrollment template for further comparison to find a match with subsequently imaged biometric object image data;
  the sensor configured to collect a subsequent set of biometric image data for a biometric object image during a limited enrollment window separate from the initial enrollment window and opened after the initial enrollment window ends;
  a computing device configured to update the stored enrollment template;
  the computing device configured to determine if the limited enrollment window remains open; and
  the computing device configured to repeat the updating of the stored enrollment template step if the limited enrollment window remains open,
  wherein in order to determine if the limited enrollment window remains open, the computing device determines the existence of at least one of a stability indicator and an instability indicator, and
  wherein the instability indicator comprises at least one of an amount of biometric image data being added to and an amount of biometric image data being removed from the stored enrollment template exceeding a selected threshold for a selected number of updates of the stored enrollment template.

16. The method of claim 1, further comprising:
  after determining the existence of an instability indicator, receiving from a user an additional authenticator apart from the biometric image data used to attempt a match with the stored enrollment template; and
  receiving biometric image data to update the stored enrollment template after receiving the additional authenticator.

17. The method of claim 2, wherein a final stored enrollment template comprises one of a previously stored enrollment template, a first version of the stored enrollment template, a stored enrollment template stored prior to any indication of the existence of an instability indicator, an average of any grouping of stored enrollment templates, and a weighted average of any grouping of stored enrollment templates.

18. The method of claim 3, wherein a final stored enrollment template comprises one of a previously stored enrollment template, a first version of the stored enrollment template, a stored enrollment template stored prior to any indication of the existence of an instability indicator, an average of any grouping of stored enrollment templates and a weighted average of any grouping of stored enrollment templates.

19. The method of claim 1, wherein a final stored enrollment template comprises one of a previously stored enrollment template, a first version of the stored enrollment template, a stored enrollment template stored prior to any indication of the existence of an instability indicator, an average of any grouping of stored enrollment templates and a weighted average of any grouping of stored enrollment templates.

20. The method of claim 4, wherein a final stored enrollment template comprises one of a previously stored enrollment template, a first version of the stored enrollment template, a stored enrollment template stored prior to any indication of the existence of an instability indicator, an average of any grouping of stored enrollment templates and a weighted average of any grouping of stored enrollment templates.

21. The non-transitory computer readable medium of claim 11, wherein a final stored enrollment template comprises one of a previously stored enrollment template, a first version of the stored enrollment template, a stored enrollment template stored prior to any indication of the existence of an instability indicator, an average of any grouping of stored enrollment templates and a weighted average of any grouping of stored enrollment templates.

22. The non-transitory computer readable medium of claim 12, wherein a final stored enrollment template comprises one of a previously stored enrollment template, a first version of the stored enrollment template, a stored enrollment template stored prior to any indication of the existence of an instability indicator, an average of any grouping of stored enrollment templates and a weighted average of any grouping of stored enrollment templates.

23. The method of claim 1,
wherein an entity performing the further comparison to find a match with subsequently imaged biometric object image data comprises a user of the biometric object image data for authentication of the user or a provider of a service of authenticating users; and
wherein the method further comprises adjusting by the entity a criteria for determining at least one of the existence of a stability indicator and an instability indicator.

24. A system comprising:
a computing device, the computing device configured to:
collect a set of biometric object image data for a biometric object image from a biometric object imaging sensor during an initial enrollment window;
store the biometric object image data in a memory as a stored enrollment template for further comparison to find a match with subsequently imaged biometric object image data;
collect a subsequent set of biometric object image data for a biometric object image from the biometric object imaging sensor during a limited enrollment window separate from the initial enrollment window and opened after the initial enrollment window ends;
update the stored enrollment template;
determine if the limited enrollment window remains open; and
repeat the collecting of a subsequent set of biometric object image data step and the updating step if the limited enrollment window remains open,
wherein the determining if the limited enrollment window remains open comprises determining the existence of one of a stability indicator and an instability indicator, and
wherein the instability indicator comprises at least one of an amount of biometric image data being added to and an amount of biometric image data being removed from the stored enrollment template exceeding a selected threshold for a selected number of updates of the stored enrollment template.

25. The system of claim 24,
wherein the stability indicator comprises at least one of a number of times the stored enrollment template has been updated and a time since the stored enrollment template was first produced.

26. The system of claim 24,
wherein the stability indicator comprises a number of successive times that an amount of change to the stored enrollment template remains below a selected threshold.

27. The system of claim 24,
wherein the instability indicator comprises at least one of a frequency at which biometric image data being added to and a frequency at which biometric image data being removed from the stored enrollment template exceeding a selected threshold.

28. The system of claim 25 wherein the stability indicator comprises both the number of times the stored enrollment template has been updated and the time since the stored enrollment template was first produced.

29. The system of claim 28 wherein when the stored enrollment template was first produced comprises one of when the biometric image data for the stored enrollment template was first produced and when the biometric image data for the stored enrollment template was first stored.

30. The system of claim 24 wherein the biometric object image comprises a fingerprint.

31. A system comprising:
a computing device, the computing device configured to:
collect a set of biometric object image data for a biometric object image from a biometric object imaging sensor;
store the biometric object image data in a memory as a stored enrollment template for further comparison to find a match with subsequently imaged biometric object image data;
collect a subsequent set of biometric object image data for a biometric object image from the biometric object imaging sensor;
update the stored enrollment template;
determine if a limited enrollment window remains open; and
repeat the collecting of a subsequent set of biometric object image data step and the updating step if the limited enrollment window remains open,
wherein the determining if the limited enrollment window remains open comprises determining the existence of one of a stability indicator and an instability indicator, and
wherein the computing device is further configured to:
after determining the existence of an instability indicator, receive from a user an additional authenticator apart from the biometric image data used to attempt a match with the stored enrollment template; and
receive biometric image data to update the stored enrollment template after receiving the additional authenticator.

32. The system of claim 25 wherein a final stored enrollment template comprises one of a previously stored enrollment template, a first version of the stored enrollment template, a stored enrollment template stored prior to any indication of the existence of an instability indicator, an average of any grouping of stored enrollment templates and a weighted average of any grouping of stored enrollment templates.

33. A method comprising:
collecting a set of biometric object image data for a biometric object image from a biometric object imaging sensor during an initial enrollment window;
storing the biometric object image data in a memory as a stored enrollment template for further comparison to find a match with subsequently imaged biometric object image data;
collecting a subsequent set of biometric object image data for a biometric object image from the biometric object imaging sensor during a limited enrollment window separate from the initial enrollment window and opened after the initial enrollment window ends;
updating the stored enrollment template;
determining if the limited enrollment window remains open; and
repeating the collecting of a subsequent set of biometric object image data step and the updating step if the limited enrollment window remains open,
wherein the determining if the limited enrollment window remains open comprises determining the existence of one of a stability indicator and an instability indicator, and
wherein the instability indicator comprises at least one of a frequency at which biometric image data being added to and a frequency at which biometric image data being removed from the stored enrollment template exceeding a selected threshold.

34. A non-transitory computer readable medium storing instructions that, when executed by a computing device, cause the computing device to perform a method, the method comprising:
- collecting a set of biometric object image data for a biometric object image from a biometric object imaging sensor during an initial enrollment window;
- storing the biometric object image data in a memory as a stored enrollment template for further comparison to find a match with subsequently imaged biometric object image data;
- collecting a subsequent set of biometric image data for a biometric object image from the biometric object imaging sensor during a limited enrollment window separate from the initial enrollment window and opened after the initial enrollment window ends;
- updating the stored enrollment template;
- determining if the limited enrollment window remains open; and
- repeating the collecting of a subsequent set of biometric data step if the limited enrollment window remains open,
- wherein the determining if the limited enrollment window remains open comprises determining the existence of at least one of a stability indicator and an instability indicator, and
- wherein the instability indicator comprises at least one of a frequency at which biometric image data being added to and a frequency at which biometric image data being removed from the stored enrollment template exceeding a selected threshold.

35. A system comprising:
- a computing device, the computing device configured to:
- collect a set of biometric object image data for a biometric object image from a biometric object imaging sensor during an initial enrollment window;
- store the biometric object image data in a memory as a stored enrollment template for further comparison to find a match with subsequently imaged biometric object image data;
- collect a subsequent set of biometric object image data for a biometric object image from the biometric object imaging sensor during a limited enrollment window separate from the initial enrollment window and opened after the initial enrollment window ends;
- update the stored enrollment template;
- determine if the limited enrollment window remains open; and
- repeat the collecting of a subsequent set of biometric object image data step and the updating step if the limited enrollment window remains open,
- wherein the determining if the limited enrollment window remains open comprises determining the existence of one of a stability indicator and an instability indicator, and
- wherein the instability indicator comprises at least one of a frequency at which biometric image data being added to and a frequency at which biometric image data being removed from the stored enrollment template exceeding a selected threshold.

\* \* \* \* \*